(12) United States Patent
Ford et al.

(10) Patent No.: US 12,142,930 B2
(45) Date of Patent: Nov. 12, 2024

(54) PORTABLE HYBRID GENERATOR

(71) Applicant: Goal Zero LLC, Bluffdale, UT (US)

(72) Inventors: Walker Ford, Holladay, UT (US); Sterling Robison, Cottonwood Heights, UT (US); Hank Howell, Herriman, UT (US); Preston Evan Price, Salt Lake City, UT (US); Norm Krantz, Draper, UT (US); Keyvan Vasefi, Lehi, UT (US)

(73) Assignee: GOAL ZERO LLC, Bluffdale, UT (US)

( * ) Notice: Subject to any disclaimer, the term of this patent is extended or adjusted under 35 U.S.C. 154(b) by 0 days.

(21) Appl. No.: 17/887,744

(22) Filed: Aug. 15, 2022

(65) Prior Publication Data

US 2022/0393478 A1    Dec. 8, 2022

Related U.S. Application Data

(63) Continuation of application No. 15/469,330, filed on Mar. 24, 2017, now Pat. No. 11,444,464.

(60) Provisional application No. 62/313,637, filed on Mar. 25, 2016.

(51) Int. Cl.
    *G05B 15/02*    (2006.01)
    *G05B 23/02*    (2006.01)
    *H02J 5/00*     (2016.01)

(52) U.S. Cl.
    CPC .............. *H02J 5/00* (2013.01); *G05B 15/02* (2013.01); *G05B 23/0272* (2013.01)

(58) Field of Classification Search
    CPC ...... F02B 63/048; F02B 63/047; F02B 63/04; H02J 3/381; H02J 7/1415; H02J 7/1438; H02J 7/34; H02J 9/062; Y02B 10/70; Y02B 10/10; Y02B 70/30; G05B 15/02
    See application file for complete search history.

(56) References Cited

U.S. PATENT DOCUMENTS

| | | | | |
|---|---|---|---|---|
| 2,173,736 | A * | 9/1939 | Thomas | H01M 50/209 324/426 |
| 5,969,435 | A * | 10/1999 | Wilhelm | H02J 1/06 307/64 |
| 7,204,696 | B1 * | 4/2007 | Libby, II | H01R 13/70 439/189 |
| 7,469,541 | B1 * | 12/2008 | Melton | H02S 20/32 60/641.1 |

(Continued)

*Primary Examiner* — Darrin D Dunn
(74) *Attorney, Agent, or Firm* — Maschoff Brennan

(57) ABSTRACT

A portable hybrid generator system includes a first unit and a second unit. The first unit includes a first housing, a first output port, and a primary energy source disposed within the first housing. The primary energy source is electrically coupled to the first output port. The second unit is separate from the first unit. The second unit includes a second housing, an input port, a second output port, and an energy storage device disposed within the second housing. The energy storage device is electrically coupled to the input port and the second output port. The energy storage device includes at least one battery. The input port and the first output port facilitate selectively electrically coupling the first unit to the second unit to charge the energy storage device. The primary energy source is specifically calibrated or calibratable to charge the energy storage device based on the at least one battery.

11 Claims, 18 Drawing Sheets

(56) References Cited

U.S. PATENT DOCUMENTS

| | | | | |
|---|---|---|---|---|
| 8,159,078 B2* | 4/2012 | Usselman | ............... | F02N 11/14 |
| | | | | 290/34 |
| 8,616,159 B1* | 12/2013 | Hawkins | ............... | F02B 63/047 |
| | | | | 123/3 |
| 8,759,714 B2* | 6/2014 | Fosbinder | ................ | B23K 9/10 |
| | | | | 219/133 |
| 8,820,286 B2* | 9/2014 | Cole | .................... | H02K 11/048 |
| | | | | 123/179.3 |
| 9,718,454 B2* | 8/2017 | Books | ................... | B60W 10/08 |
| 10,389,121 B1* | 8/2019 | Sherry | ...................... | H02J 3/02 |
| 2006/0087122 A1* | 4/2006 | Sheffield | ................ | H02K 47/04 |
| | | | | 290/1 R |
| 2007/0013340 A1* | 1/2007 | Mattichak | ........... | H02J 7/00306 |
| | | | | 320/101 |
| 2007/0158120 A1* | 7/2007 | Lee | ......................... | F02N 11/04 |
| | | | | 180/65.28 |
| 2009/0295169 A1* | 12/2009 | Usselman | ........... | F02N 11/0862 |
| | | | | 290/1 A |
| 2010/0060015 A1* | 3/2010 | Buker | .................... | F02B 63/04 |
| | | | | 290/1 R |
| 2010/0102772 A1* | 4/2010 | Smith | ....................... | H02J 7/35 |
| | | | | 320/101 |
| 2010/0198421 A1* | 8/2010 | Fahimi | ..................... | H02J 3/32 |
| | | | | 700/291 |
| 2011/0214423 A1* | 9/2011 | Givens | ................... | F02B 63/04 |
| | | | | 290/1 A |
| 2012/0112544 A1* | 5/2012 | Salcone | ............... | H02J 7/0048 |
| | | | | 307/65 |
| 2014/0284936 A1* | 9/2014 | Grant | ................. | F02N 11/0862 |
| | | | | 290/1 A |
| 2016/0006384 A1* | 1/2016 | Hardwick | ................ | H02P 9/08 |
| | | | | 700/287 |

\* cited by examiner

PORTABLE HYBRID GENERATOR

CROSS-REFERENCE TO RELATED PATENT APPLICATIONS

This application is a continuation of U.S. patent application Ser. No. 15/469,330, filed Mar. 24, 2017, which claims the benefit of and priority to U.S. Provisional Patent Application No. 62/313,637, filed Mar. 25, 2016, both of which are incorporated herein by reference in their entireties.

BACKGROUND

Portable generators provide important support for consumers in need of energy resources in locations where main grid energy sources are not available, and/or as backup energy resources when dedicated energy sources are down. To efficiently meet the needs of consumers, portable generators must be relatively easy to use, they must also provide efficient, dependable, and reliable energy in an easy to transport package that requires little maintenance. Under ideal circumstances, portable generators would also be functional in a variety of indoor and outdoor environments; using raw energy sources that are readily available and capable of providing a predictable quantity of energy for the consumer to use from reliable energy sources, regardless of weather conditions, wind levels, sun levels, or the like.

Conventional portable generators are not ideal or optimized for consumer versatility. Conventional portable generators may be unreliable without preventative maintenance, and they may provide little or no information about remaining run-time, load and efficiency metrics, or system health. Furthermore, the continuous combustion of liquid and gas fuel sources in conventional portable generators may be noisy and pose air pollution concerns, thereby limiting operation to outdoor areas. Solar and battery based portable energy sources are safer, but plagued by other issues including cost, efficiency and variable or unreliable weather conditions. To sustain and address the expanding needs of portable energy consumers, it is increasingly important that improvements be made to the existing portable energy generator offerings. In particular, there is a need for easy to use systems that can be quickly and efficiently transported and used to provide cost effective, dependable and reliable energy for customers in need of portable energy supply for their low energy needs.

SUMMARY

A portable hybrid generator may comprise a system for managing energy sources and loads using a small portable package. A portable hybrid generator may have multiple advantages over conventional generators. A portable hybrid generator may have a quieter run time and more efficient usage of gasoline over non-battery generators. In comparison with conventional non-battery generators, a portable hybrid generator may operate at peak efficiency 100% of time. In some instances a portable hybrid generator may comprise a Primary Energy Source (PES), for example an engine that is calibrated specifically to an Energy Storage Unit (ESU), wherein an ESU may comprise a single battery or a set of batteries. In some embodiments, the calibration may automatically occur when the portable hybrid generator is powered on. The calibration may automatically occur when a new ESU is provided for the portable hybrid generator. The calibration may occur on a periodic basis. The calibration may occur in response to a user command or input. In some embodiments, a user interface may be provided that may permit the calibration to occur. The user interface may permit a user input that may allow the calibration and/or generator operation to occur. The user interface may be configured to cause the user to provide an input that maximizes or improves performance without causing a safety issue. Calibrating the PES to an ESU may provide significant advantages over conventional generators. In some instances energy generated by the PES may be stored in the ESU even when there are no loads on the portable hybrid generator—as such, energy from the PES may be conserved instead of lost. This may contrast with portable generators that lack an ESU, and may run when non-optimal or even when no load is engaged, thus potentially resulting in a waste of fuel, and use of a larger PES than necessary for a given load or set of loads.

A portable hybrid generator may be equipped to sustain loads that are variable over time. In these instances a portable hybrid generator may provide power equivalent to a comparably sized conventional generator with increased efficiency, because the portable hybrid generator may be equipped to provide the fully stored capacity of the ESU and the full capacity of the PES. In instances where the energy is provided by both the PES and the ESU reserves, the portable hybrid generator may be able to meet the energy demands and loads of a system wherein the load is variable from a peak load over time. As such, the size of the PES may be smaller than would be required in a conventional generator and more efficient since the ESU may be storing energy when the load is not engaging the system. In some instances a portable hybrid generator may comprise a combustion engine that is smaller than the size of a combustion engine found in a conventional generator equipped to sustain comparable energy. Other benefits over conventional generators may include less noise since the engine may only need to run part-time, and increased efficiency—since the engine will only have one load it may be tuned and optimized for that load.

A portable hybrid generator may comprise a controller and communications port connected to a primary energy source and an energy storage unit. In some instances a microcontroller of the controller and communications port may be configured for maximizing the power output of the primary energy source by modulating any combination of the voltage, throttle, and choke of the primary energy source. In further embodiments the microcontroller may use information from the primary energy source and the energy storage unit to output according to a selected usage mode. The primary energy source in a portable hybrid generator may comprise an engine and a maximum power-point transfer charger. The energy storage unit in a portable hybrid generator may comprise one or more batteries. The energy storage unit may comprise one or more detachable sensors, wherein the sensors may detect environmental conditions of the portable hybrid generator. In some instances the controller and communications port may use information from the one or more environmental sensors to optimize the output and efficiency of the portable hybrid generator. In some instances, the portable hybrid generator may have one or more usage modes. Usage modes may be set or changed by an application run on a mobile device in wireless communication between the controller and communications port of the portable hybrid generator. In further embodiments, the controller and communications port may be made user friendly, for example the portable hybrid generator may be configured to comprise a controller and communications port configured to detect the state of one or more components in the system and provide users with automatic maintenance notifications.

These and other embodiments are described in further detail in the following description related to the appended drawing figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
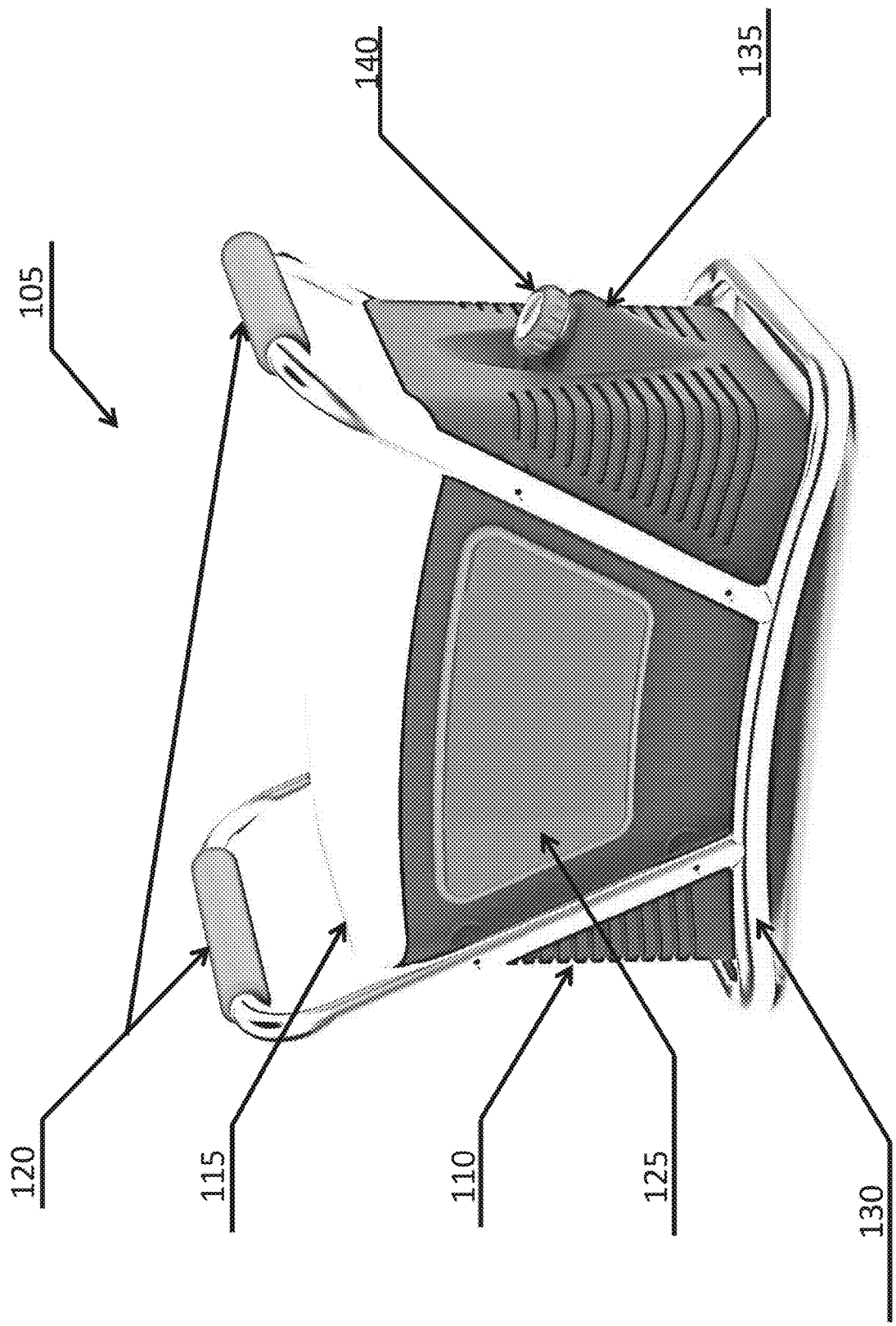
FIG. 1 illustrates a portable hybrid generator.

The present invention is a portable hybrid generator. A portable hybrid generator may comprise a system for managing energy sources and loads using a small portable package. A portable hybrid generator may have multiple advantages over conventional generators. A portable hybrid generator may have a quieter run time and more efficient usage of gasoline over non-battery generators. In comparison with conventional non-battery generators, a portable hybrid generator may operate at peak efficiency 100% of time. In some instances a portable hybrid generator may comprise a Primary Energy Source (PES), for example an engine calibrated specifically to an Energy Storage Unit (ESU), wherein an ESU may comprise a single battery or a set of batteries. Calibrating the PES to an ESU may provide significant advantages over conventional generators. In some instances energy generated by the PES may be stored in the ESU even when there are no loads on the portable hybrid generator—as such, energy from the PES may be conserved instead of lost. This may contrast with portable generators that lack an ESU, and may run when non-optimal or even when no load is engaged, thus potentially resulting in a waste of fuel, and use of a larger PES than necessary for a given load or set of loads.

A portable hybrid generator may be equipped to sustain loads that are variable over time. In these instances a portable hybrid generator may provide power equivalent to a comparably sized conventional generator with increased efficiency, because the portable hybrid generator may be equipped to provide the fully stored capacity of the ESU and the full capacity of the PES. In instances where the energy is provided by both the PES and the ESU reserves, the portable hybrid generator may be able to meet the energy demands and loads of a system wherein the loads variable from a peak load over time. As such, the size of the PES may be smaller than would be required in a conventional generator and more efficient since the ESU may be storing energy when the load is not engaging the system. In some instances a portable hybrid generator may comprise a combustion engine that is smaller than the size of a combustion engine found in a conventional generator equipped to sustain comparable energy.

A portable hybrid generator may be a self-contained unit or a multi-component unit. In instances where the portable hybrid generator is a self-contained unit, the Primary Energy Source (PES) and Energy Storage Unit (ESU) may be housed together in a single self-contained portable hybrid generator (105). In other instances, the hybrid power generator may be multi-unit comprising a PES contained in a PES containing unit, and one or more separate ESUs that may be removably connected to the PES. In a multi-unit system the PES and separate ESUs may together comprise the portable hybrid generator.

A portable hybrid generator may comprise features including a user interface which may make the device user friendly. Easy to use feature may include minimizing of the number of buttons necessary to operate the system or device. For example the system or device may be configured to include a "one-click" to automatically start and run. Easy to use features may further comprise features that enable the system to provide important feedback to the user regarding system maintenance. The user may not need to know when to maintain the engine—the system may inform the user when an oil change is needed, or when other system properties are in question. Furthermore, the system may act in a way to minimize common sources of problems, for example entering a storage mode that will empty the fuel from the carburetor which may prevent the most common source of engine failure.

A portable hybrid generator may comprise means for matching the loads within one or more components of the system. In some instances a PES and an ESU may be configured with load matching to minimize the loss of energy to during charging of the battery. Examples of load matching may include impedance matching with may involve matching the input impedance of one system with the output impedance of another as a means of optimizing the power transfer and minimizing the signal reflection from the load. In some embodiments a communication module or microprocessor, for example the type that may exist in the control and communications port (CCP) of the disclosed device/system, may regulate energy transfer between a PES and an ESU to facilitate load matching.

A portable hybrid generator may comprise a storage mode. The storage mode may prevent clogging that is common in engines that are stored while filled with fuel. In some instances, while the engine is running a communications module, for example the type that would exist in the control and communications port (CCP), may turn off the fuel valve. The engine may continue to run until the fuel in the line is used up. In these instances, the engine carburetor may be left empty which may prevent build-up in the carburetor that would later prevented engine startup. The engine may start up cleanly the next time. In some instances, the device or system may comprise a small supplemental tank that holds fuel stabilizer. In storage mode this stabilizer may be automatically injected into the fuel, allowing for longer fuel shelf-life. The CCP may comprise components for tracking the time that the engine has been out of operation and alert the user with audible, visual and network messages of the need to start up the system or replace the staling fuel.

As shown in FIG. 1, the PES containing unit (105) or self-contained portable hybrid generator (105) may resemble a cooler, with components that make it easy to transport. For example the PES containing unit (105) or self-contained portable hybrid generator (105) may comprise wheels or rollers, handles, detachable cart or other means of make it easy to transport. The PES containing unit or self-contained portable hybrid generator may comprise handles (120). The handles may comprise means for cushioning the user grip during transport, for example the handles may comprise texturized foam padding. A PES containing unit (105) or self-contained portable hybrid generator (105) may comprise a housing (110). In some instances the housing may be manufactured out of either a stamped steel/aluminum enclosure or an extruded steel/aluminum enclosure. The housing may comprise injection molded plastic top, bottom and front face which allow for a customized look and certain useful features that are not available from a stamped or extruded process.

Housing (110) may comprise any tough or durable materials including polymer based materials, plastic, aluminum, or other durable and lightweight materials. Housing (110) may be configured to keep the system secure, sound proof, easy to transport, lightweight, and portable. The housing (110) components may be corrugated or welded. In some instances the housing may be constructed of temperature resistant materials. The housing (110) may be configured to hold components during transport, during operation, or during both transport and operation. In some instances, one or more components may be removed from the housing (110) after transport and/or upon deployment. The housing (110) may be formed from a rigid material that may protect one or more of the components. The housing (110) may optionally protect components within the container from environmental conditions (e.g., rain, wind, dust, heat, radiation). The housing (110) may or may not be fluid-tight.

The housing (110) may have any shape or dimension. For example, the housing (110) may form a rectangular prism, a cube, a chain of rectangular prisms, orthogonal rectangular prisms, or any combination thereof. The housing (110) may have a dimension (e.g., a length, width, height, diagonal, diameter, or any other dimension) that may be less than or equal to 3 inches, 4 inches, 6 inches, 8 inches, 10 inches, 1 foot, 1⅓ feet, 1.5 feet, 1⅔ feet, 2 feet, 3 feet, 4 feet, or 5 feet. The device or system may weigh less than, greater than, or equal to about 10 lbs, 20 lbs, 40 lbs, 60 lbs, 80 lbs, 100 lbs, 120 lbs, 140 lbs, 150 lbs, and 160 lbs.

In some embodiments, the housing (110) may be divided into one or more compartments of varying sizes. The separations may be constructed of any material including structural insulated paneling, fiberglass reinforced plastic (FRP) paneling, sheet metal, plywood, magnesium oxide board, oriented strand board, plaster, stamped metal inner frame, or any combination thereof. In some embodiments, different types of components may be stored within different compartments of the unit. The compartments may have similar dimensions to one another or different dimensions from one another. In some instances, different compartments may have different functions, such as storage, energy generation, battery storage, solar panel storage, inverter storage, energy storage, and storage for communications port components.

The housing (110) may include one or more openings that may be repeatedly opened and/or closed. For example, the PES containing unit (105) or self-contained portable hybrid generator (105) may comprise a lid (115), the lid may be removable or affixed using screws, tabs, hinges or other means of removably affixing the lid to the top of the housing (110). The PES containing unit may comprise a series of ports displayed on a plate (125) from which ports me be accessible to devices or units outside the housing. The ports may comprise port covers, such that the port covers must be removed to expose the ports. Port covers may be weather proof. In some instance the port covers may comprise materials that are non-conductive for example plastic or rubber. The housing may comprise a frame (130) for supporting the housing and providing handles (120) for easy transport. In some embodiments the frame may be constructed from hollow tubes, the hollow tubes may be comprised of metal, pvc, or other durable and light materials that can be connected together and attached to the housing. The frame may be attached to the housing using screws, nails, pins, notches, solder, welds or other means of affixing the housing to the frame.

The PES containing unit (105) or self-contained portable hybrid generator (105) may comprise a fuel tank (135) for storing liquid or gaseous raw fuel sources. The fuel tank may comprise a cover or lid (140) for retaining the raw fuel source. In some instances the tank (135) may comprise a vessel for holding and transporting liquid fuel sources. In other instances, the tank (135) may comprise one or more ports for attaching a cylinder containing gas, for example propane gas. In some embodiments, the fuel tank may comprise a fuel level sensor.

Figure 2:
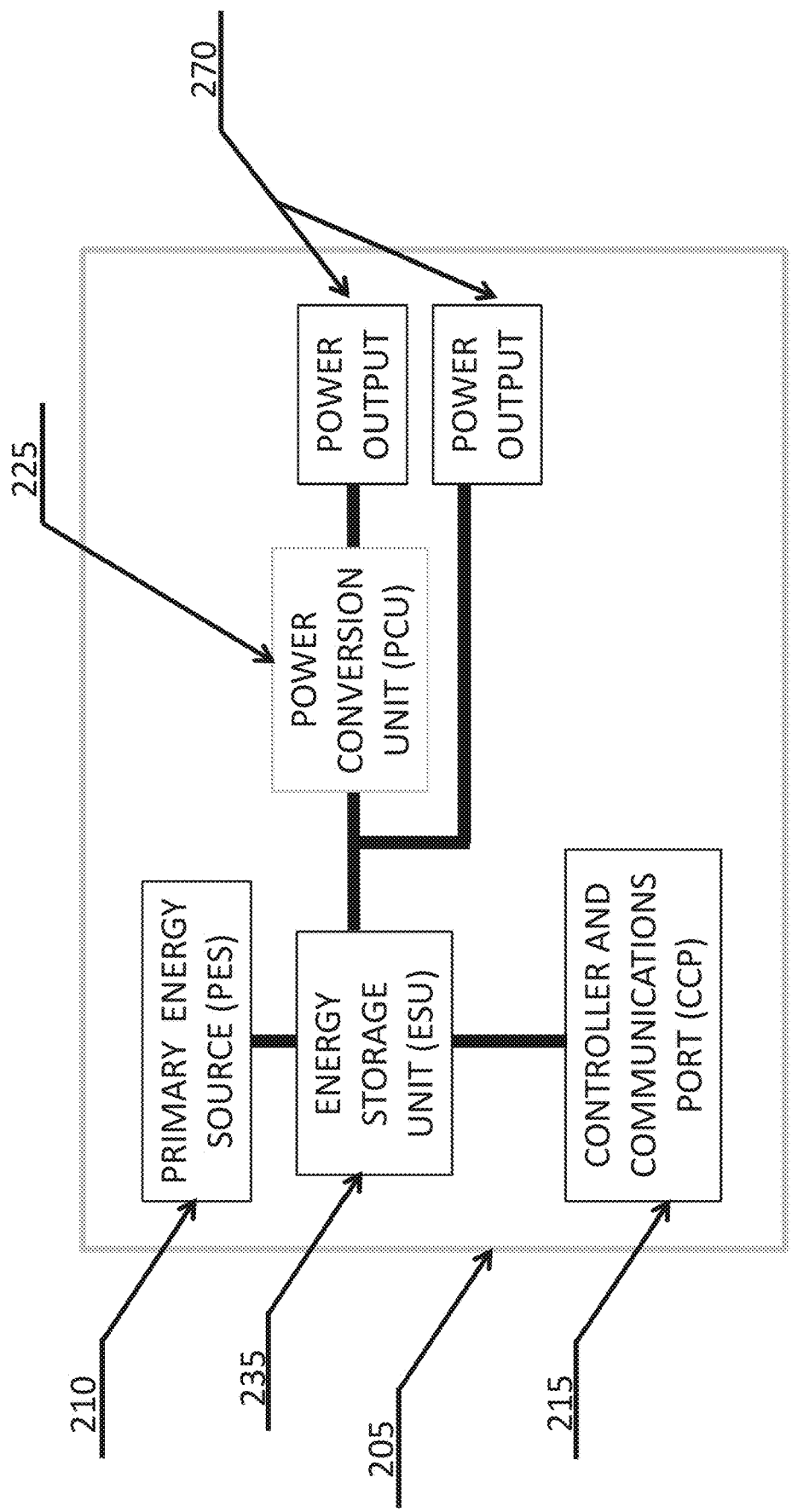
FIG. 2 illustrates a block diagram for a self-contained portable hybrid generator unit with an energy storage unit (ESU) as the source of the energy used to support portable hybrid generator loads.

The portable hybrid generator may comprise a self-contained unit with a housing enclosing multiple components. FIG. 2 illustrates an embodiment of a self-contained portable hybrid generator (205) comprising a primary energy source or PES (210), energy storage unit or ESU (235), power conversion unit or PCU (225), controller and communications port (215), and power outputs (270), with the aforementioned units housed within a single self-contained portable hybrid generator.

In some instances the PES (210) may generate power that may be stored in the ESU (235). Energy stored in an ESU (235) may power the controller and communication port. In further embodiments, power stored in the ESU (235) may also be used to directly power loads through one or more power outputs or ports. In some instances power from the ESU may go through a Power Conversion Unit or PCU (225). In instances where the ESU comprises energy stored as direct current (DC), a PCU may convert direct current (DC) to alternating current (AC), allowing the self-contained portable hybrid generator to support loads through AC plugs or adaptors.

In some instances the ESU may comprise a battery, and the PES (210) may comprise a combustion engine. In these cases, the combustion engine may produce mechanical energy from liquid or gaseous raw fuel. The mechanical energy may be converted into stored energy. In some instances, energy generated from the PES may be used solely to provide and store energy in the ESU (235). Power stored in the ESU may go directly through a power output where it powers loads through direct current (DC) plugs or adaptors. Power stored in the ESU (235) may also be drawn through a PCU (225), in some instances the PCU (225) may comprise an inverter that converts direct current from the battery to alternating current that may be available through an AC plug or plugs.

Figure 3:
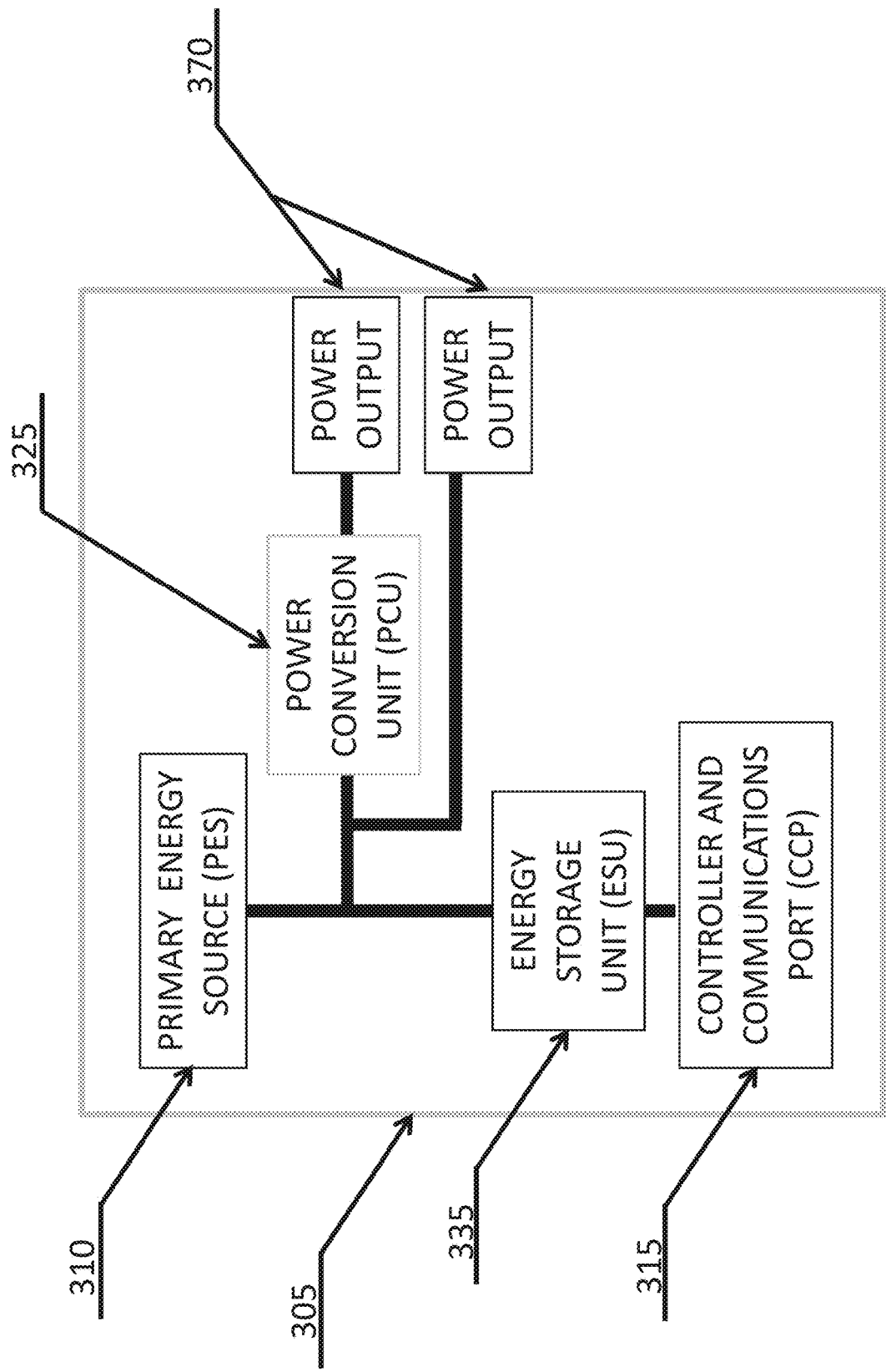
FIG. 3 illustrates a block diagram for a self-contained portable hybrid generator unit with the primary energy source (PES) and the energy storage unit (ESU) as the sources of energy for portable hybrid generator loads.

In alternate instances as shown in FIG. 3, the ESU (335) and the PES (310) may both provide energy that may be drawn directly from a power output (370), or drawn through a PCU (325) before being drawn through a power output (375). In these cases, the ESU may comprise a battery and the PES may comprise an engine. The PES (310) may generate mechanical energy from liquid or gaseous raw material. In some instances mechanical energy from the PES (310) may be converted into stored energy in the ESU (335). In instances when there is no load on the self-contained portable hybrid generator, and no energy is drawn through the one or more power outputs, energy from the generator may be solely stored in the ESU. In other instances, loads on the self-contained portable hybrid generator may result in energy drawn through the one or more power outputs. Power from both the battery and the generator may be drawn to meet the power needs of the system and the loads. In some instances the power needs of one or more loads on the system may be preferentially met by the ESU (335) over the PES (310). In some instances, energy generated by the PES (310), may be directed primary towards maintaining charge in the ESU (335). In other instances, the ESU (335) and PES (310), may provide equal amounts of power through one or more power outputs (370). In other instances, the ESU (335) may provide less power than the PES (310), through one or more power outputs (370). In further instances, the ESU (335) and PES (310) may provide differing amounts of power through one or more power outputs (370). Power stored in the ESU (335) or generated from the PES (310) may be drawn through a PCU (325). In some instances the PCU (325) may comprise an inverter that converts direct current from the battery to alternating current that may be available through an AC plug or plugs. Power stored in the ESU (335) or generated from the PES (310) may also be drawn directly through one or more power outputs (370), without first moving through a PCU (325)—in these cases, power may be drawn as direct current, and may be available through one or more DC plugs or connectors.

Figure 4:
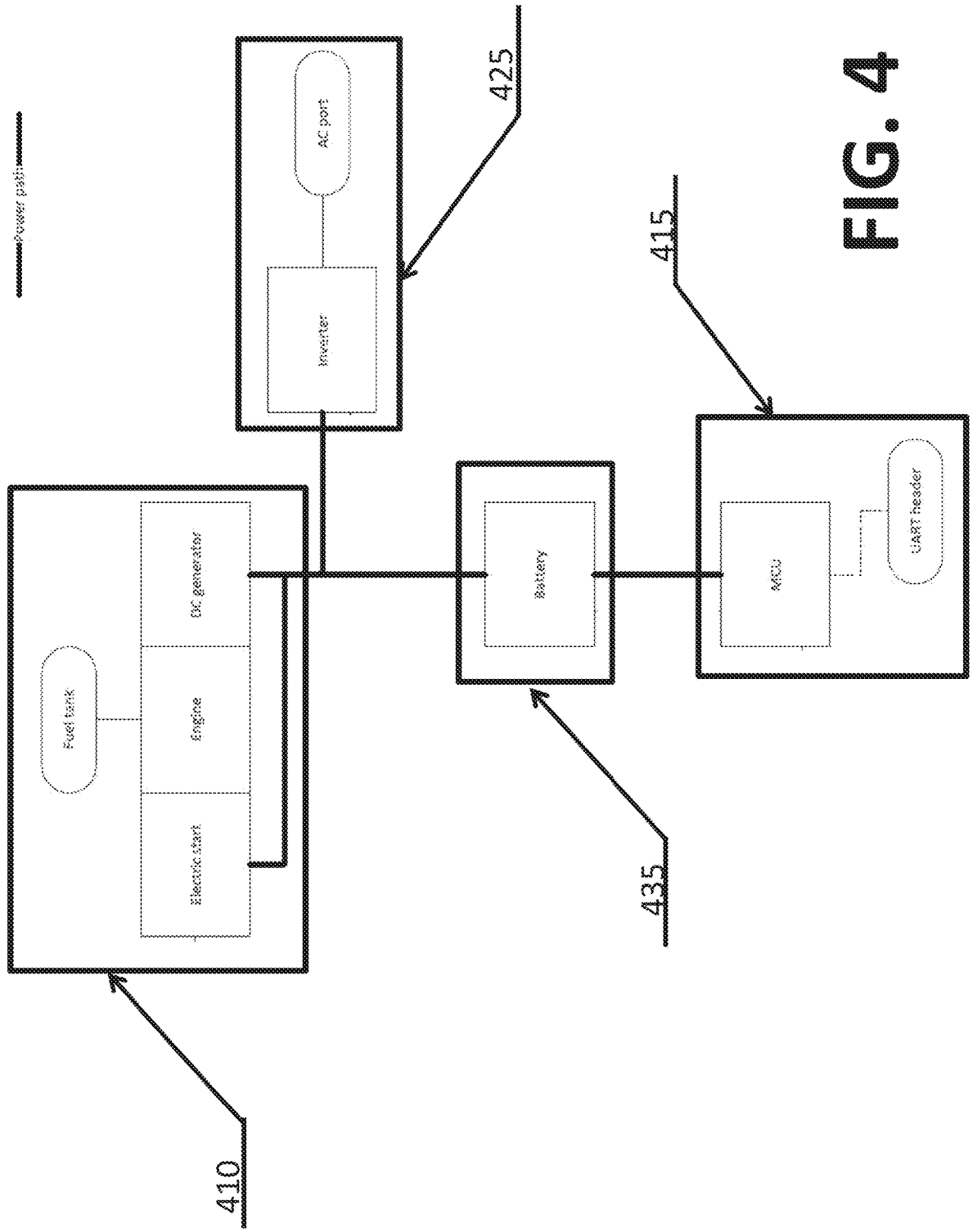
FIG. 4 illustrates a block diagram for subcomponents comprising the primary energy source (PES), power conversion unit (PCU), energy storage unit (ESU), and controller and communication port (CCP).

FIG. 4 illustrates examples of subcomponents that may comprise a primary energy source or PES (410), a power conversion unit or PCU (425), an energy storage unit (425), and a controller and communications port (415). FIG. 4 illustrates examples of subcomponents that may comprise a primary energy source or PES (410), a power conversion unit or PCU (425), an energy storage unit (425), and a controller and communications port (415).

Components—Primary Energy Source (PES)

In some embodiments a PES may comprise a generator, an engine, a fuel tank, and an engine starter. A generator may operate to generate electricity by consuming fuel. The generator may include dynamos, alternators, rotors, stators, turbines, armatures, or field generators. The generators may produce alternating current (AC), direct current (DC) or both alternating current (AC) and direct current (DC). In some instances a DC generator may be separately excited or self-excited. Separately excited generators may comprise field coils that are energized from an independent external DC source. Self-excited DC generators may comprise field coils that are energized by current produced by the generator itself. Examples of self-excited DC generators may include series wound, shunt wound, or compound wound self-excited DC generators. In some instances a DC generator may comprise a DC motor, a DC generator or any other type of DC machine. Direct current generators may include homopolar generators, or magnetohydrodynamic generators (MDH generators). Alternating current generators may include induction generators, linear electric generators or variable speed constant frequency generators. The electricity generated by the generator may be delivered directly to a load and/or may be stored.

In some instances a PES may comprise an engine. An engine may be any unit that provides energy from fuel, including combustion engines and catalytic engines. An engine may provide energy in the form of mechanical energy, and mechanical from the engine may be directed into a generator to produce electricity. In some instances the size of the engine may be directly proportional to the maximum power that the engine can produce. The engine may be fueled by liquid or gaseous raw fuel, for example the engine may operate on diesel, gasoline, propane (liquid or gaseous), and/or natural gas. Examples of fuels may include liquid, solid or gas fuels. Liquid fuels may include petroleum, diesel, gasoline, kerosene, LPG, coal tar, naptha and ethanol. Solid fuels may include wood, coal, peat, dung, coke and charcoal. Gaseous fuels may include natural gas, hydrogen, propane, coal gas, water gas, blast furnace gas, coke oven gas, and compressed natural gas. In some instances an engine may operate on only one type of fuel. In other instances an engine may be able operate one or more different types of fuel, for example in some instances an engine may be a dual feed engine. A dual feed engine may have a bi-fuel operation mode, wherein the engine may operate on more than one type of fuel. In some instances an engine may comprise a combustion engine, for example an internal combustion engine. In these instances, an engine may comprise one or more combustion chambers or cylinders. The combustion engine may be enclosed in a housing designed to minimize wasted space. The combustion engine may be less than, greater than or equal to 5 cubic centimeters, 10 cubic centimeters, 15 cubic centimeters, 20 cubic centimeters, 25 cubic centimeters, 30 cubic centimeters, 40 cubic centimeters, 50 cubic centimeters, 75 cubic centimeters, and 100 cubic centimeters.

An engine may comprise an overhead valve engine or a non-overhead valve engine. In instances when an overhead valve engine is used, the intake and exhaust valves of the engine may be located in the head of the engines cylinder. Overhead valve engines may offer advantages including more compact design, simpler operation, extended durability, user-friendly operations, lower operation noise, and lower emission levels. In other instance a non-overhead valve engine may be used, in a non-overhead valve engine the intake and exhaust valves of the engine may be mounted on another part of the engine, for example on the engine block.

In some instances the engine may comprise a 4-stroke combustion engine. A 4-stroke combustion engine does not need oil to be mixed into the gasoline. A 4-stroke engine may be more convenient for an average person to run, since all that would be required is gasoline. The engine may also be configured to run off of gas-state fuels like propane.

An engine may comprise features that enhance the durability and reliability of engine. For example, in some instances an engine may comprise a cast iron sleeve in the engine cylinder. A cast iron sleeve may comprise a lining in the cylinder of the engine. The cast iron sleeve lining may reduce wear and ensure the durability of the engine, and may ensure the durability of the engine particularly in instances where the generator is operated for long periods of time.

A PES may further comprise a fuel system, wherein the fuel system may comprise any combination of: a fuel tank, a carburetor, a fuel injection system, a fuel pump, an oxidizer-air inlet system, fuel pipes, connectors, separators, or any combination thereof. A fuel system may further comprise a fuel tank for storing fuel and fuel reserves. In some embodiments a fuel tank may comprise a fuel level sensor. Fuel capacity in the tank may comprise a volume of less than, greater than, or equal to 0.25, 0.5, 1, 2, 3, 4, 5, 7, or 10 gallons. In some embodiments fuel reserves may be sufficient to recharge the battery 5-20 times. The battery capacity may be configured to support a specific load, so the volume of gas required for a single charge cycle may differ depending on the intended load. Fuel pipes may comprise for example pipes for connecting a fuel tank to the engine. Fuel pipes may further comprise one or more ventilation pipes to prevent build-up of pressure or vacuum during refilling and drainage of the tank. A fuel system may further comprise an overflow connection from the fuel tank to a drain pipe, to prevent spillage of the fuel. Further embodiments of a fuel system may comprise a fuel pump for transferring fuel from a main storage tank to a smaller day tank. Fuel system may further comprise a fuel water separator or a fuel filter, for separating water or foreign matter from the fuel and protect the engine and or generator. A fuel system may further comprise a fuel injector for atomizing liquid fuel into another chamber, for example a combustion chamber. In some embodiments the fuel system may have manual controls. In some embodiments the fuel system may further comprise a fuel valve. In some instances a fuel valve may comprise a solenoid. In further instances the fuel valve may be manually controlled or automatically controlled.

A PES may further comprise a choke valve. In some embodiments, the choke valve may be physically controlled by a mechanical solenoid, the mechanical solenoid may allow the choke to open fully or partially and close completely. In some instances a user may be able to manually control the choke to operate the PES or engine under a variety of conditions. In some instances the choke may be automatically controlled by a controller and communications port.

A PES may further comprise an ignition system, wherein the ignition system may comprise a spark, for example an electrical spark. In some instances the timing of the electric spark may be precisely controlled by a controller and communication port. In some instances the PES may have a manual shutoff. A PES may also have an emergency shutoff that can be manually operated.

In some instances a PES unit may comprise an alternator, or genhead. The alternator or genhead may produce electrical output from mechanical energy input by the engine. An alternator may comprise one or more stationary and/or moving parts assembled and encased in housing. The components of an alternator may work together to generate electricity, by causing relative movement between magnetic and electric field. Components of an alternator may comprise a stator, a rotor/armature, housing, bearings and design elements or features. A stator may be a stationary component comprised of a set of electrical conductors wound into coils over a metal core, for example an iron core. A rotor/armature may be a moving component that produces a rotating magnetic field. The rotating magnetic field may be produced by a variety of means for example: through induction, permanent magnets, or through an exciter or small source of DC that energizes the rotor through a series of conducting slip rings or brushes. In some instances an alternator may comprise alternator housing, in further instances the alternator housing may be comprised of metal or plastic. An alternator may further comprise bearings; bearings may include any combination of ball bearings and needle mearings. Further alternator embodiments may comprise design elements including brushless design, in these cases an alternator may not use brushes and as such may require less maintenance and cleaner power.

A primary energy source or PES may further comprise a cooling and an exhaust system. A cooling system may comprise means for transferring or coolant or other fluids including raw or fresh water through a system to cool one or more generators. An exhaust system may comprise pipes, including free standing pipes that are not supported by the engine or generator. Pipes may exhaust gasses or other waste products out of the generator or engine and away from the system. Pipes may be constructed of solid, sturdy materials including metals for example cast iron, wrought iron, and steel.

A PES may further comprise a lubricating system to ensure that parts in the generator and or engine are kept operating, and retain durable smooth operations for extended periods of time. A generator engine may be lubricated by oil stored in a pump. A lubrication system may comprise gauges or other components for indicating the level of lubricant in the system. In further instances a PES may comprise one or more mechanisms for converting or regulating voltage. Components may comprise a voltage regulator for converting AC voltage to DC current, exciter winding for converting DC current to AC current, rotating rectifiers for converting AC current to DC current, and/or a rotor or armature system for converting DC current to AC voltage.

In some embodiments, a PES may comprise a DC machine, including for example a DC generator, a DC genset, or a DC motor. In a DC machine, field coils may produce an electromagnetic field as armature conductors are rotated into the field. To produce an electromagnetic field, an aforementioned DC machine, may comprise two general components, a stator and a rotor. In these instances the rotor component may comprise an armature and the stator may comprise a yoke further comprising field coils. In some instances a DC machine may comprise any single or combination of a yoke, a pole, field winding, an armature, armature conductors, brushes, commutator, and a terminal box for direct the current out of the machine. Field winding may comprise coils constructed from copper. The coils may be field coils, wherein the coils may be former wound, or wound on a frame before mounting. In a DC machine, field coils or former-wound coils, may be wound around poles such that when energized they form alternate North and South poles. A yoke may comprise the outer frame of a DC machine. In some instances a yoke may comprise a metal, for example cast iron or steel. In some instances, a yoke may provide mechanical strength to the whole assembly. A yoke may further function to carry magnetic flux resulting from field winding. A DC machine may further comprise poles or pole shoes. In further embodiments poles may join the yoke using bolts or welding. In some instances poles may carry the field winding. Further embodiments may comprise pole shoes, wherein the pole shoes may be attached to the field winding. Pole shoes may support field coils, and in further instances pole shoes may spread out the fix in air gap uniformly. A DC machine may further comprise an armature. In some instance an armature may be disposed within the center of the yoke. In some instances an armature may be comprise an armature core, armature winding, armature conductors, a commutator, and brushes. Coils may connect the armature and field windings disposed around one or more poles, into a terminal box. The armature may comprise an armature core, wherein the armature core may operate as the rotor of the machine. An armature core may comprise thin laminated circular steel disks, for example to reduce eddy current losses. The armature core may comprise air ducts for cooling through axial air flow. An armature core may be keyed to the shaft of a motor. An armature may further comprise armature winding, wherein armature winding may be disposed within slots in the armature core. Armature winding may comprise former wound copper coil, wherein the former wound copper coil rests in armature slots. Armature winding may be wound by various methods, for example lap winding or wave winding. In some instances winding may be done in double layers. In some instances double layer winding may be used, in these cases the slots may comprise different coils or windings. Further embodiments of a DC machine may comprise a commutator and brushes, such that the commutator and brushes are in physical connection with the armature winding. Armature conductors may be disposed from the armature in groves formed in the armature. In instances where the DC machine is a DC generator, a commutator may collect current generated in armature conductors. Alternatively, in instances where a DC machine is a DC motor, the commutator may help provide current to the armature conductors. In some instances a commutator may comprise a set of copper segments, arranged such that the segments are insulated from each other. In some instances the number of segments may be equivalent to the number of armature coils. In further embodiments, each segment connected to an armature coil and the commutator may be keyed to the shaft. The DC machine may further comprise brushes. Brushes may be comprised of carbon or graphite. In some instance the brushes may rest on commutator segments and slide on the segments as the commutator rotates. The brushes may keep physical contact with the commutator segments to collect or supply current.

In some instance the DC machine or DC genset may operate in reverse so that it can start the engine. In these instances power may be drawn from a battery to make the genset turn. The genset may be connected directly to the engine and may turn the engine. A controller, for example the controller in the CCP may stop the genset once it determines that the engine has started. In alternate embodiments the engine may be started with a separate electric dc motor, in some instances this option for starting may be used if the genset starter does not work. In some embodiments the engine may be able to start remotely either by the system computer's auto-start algorithm or by the user pressing a start button.

In some embodiments a PES may comprise an engine that may be smaller than the size used in most generators. In some instances a PES is coupled with an ESU to shift output peak loading to the ESU instead of the motor, as disclosed in FIG. 2 and FIG. 3 among other figures disclosed in the present application. In further instances, shifting output peak loading to the battery instead of the motor may be a key feature that facilitates improve efficiency and reduces the size of the engine required for supporting a given load.

A PES may further comprise a control panel, wherein the control panel may comprise switches, outlets or other controls for starting including electrical start, shut-down, gauges for reading the status of the engine or generator, and other controls. Engine gauges may include readouts for oil pressure, coolant, battery voltage, engine rotation speed, and duration of operation. Generator gauges may comprise nits for measuring output current and voltage, and operational frequency. Other controls may comprise phase selector switches, frequency switches, and engine control switches including manual and auto modes.

Addition PES embodiments may comprise an ESU charger, for example a battery charger. An ESU charger may keep an ESU charged by sustaining a precise 'float voltage'. The float voltage may be set to sustain a threshold ESU voltage that is not too low as to undercharge the ESU and not too high as to shorten the life of the ESU. An ESU charger may comprise a corrosion resistant material for example stainless steel. An ESU charger may be constructed to be fully automatic, so as not to require adjustments or settings to be made or changed. An ESU charger may have an isolated DV voltage output. In many instances, the DV voltage output will not interfere with normal generator functioning. In some instances, for example when an ESU is a lead-acid battery, a DC output voltage of a battery charger may be set at 2.33 volts per cell.

Components—Energy Storage Unit (ESU)

An ESU may comprise any form of energy storage apparatus including a battery, capacitor or any combination thereof. Any type of battery may be employed including secondary cell and primary cell batteries. Examples of secondary cell batteries that may be used include lithium ion, nickel metal hydride, nickel cadmium, flow batteries, lead-acid batteries, lithium-air batteries, nickel-hydrogen batteries, and polymer-based batteries. Batteries may be connected into racks, and/or connected in series. The batteries may come stored in a battery racking system. In some embodiments the battery racking system may be configured to store one or more battery trays in one or more vertical stacks, horizontal arrangements, or any combination thereof. Each tray may contain a tray battery management system (tray BMS) and multiple battery cells, for example trays may contain less than, greater than or equal to 4 cells, 8 cells, 16 cells, or 24 cells. The batteries including single batteries, battery cells, trays or racks may be connected in series, in parallel, or any combination thereof. One or more batteries within the battery packs may be connected in series, in parallel, or any combination thereof. The trays may be built into racks and equipped with rack battery management system (BMS).

In some embodiments a battery may comprise balancing, gauging, or protective functions. Balancing, functions may be built in to keep all cells within the battery at the same voltage. Gauging functions may be built in to provide means for gauging the state of the charge of a battery. Protective functions that may be built into the battery may include protections against over-voltage, over-current, and under-voltage states.

Components—Controller and Communication Port (CCP)

A Controller and Communication Port may comprise a microcontroller unit (MCU), and a communications bus header (e.g. a universal asynchronous receiver/transmitter (UART) header, IIC, SPI, CAN, RS485, etc.). An MCU may take in all sensor inputs and operates all actuated outputs in order to maximize efficiency and ease-of-use for the user. In some instances, the MCU may comprise controls and a user interface, which may comprise buttons and a display. A microcontroller unit may comprise a single chip with a processor or central processing unit (CPU), non-volatile memory for the program (ROM or flash), volatile memory for input and output (RAM), a clock, and an I/O control unit.

In some embodiments the CCP may be configured to connect to an external battery with a 2-way communications bus. In these instances the 2-way communication bus may enable the controller in the generator to learn about the connected battery. Parameters that may be learned about the battery may include the state, capacity, life-cycle, etc. The information CCP may use the learned information to control and regulate the generator, specifically modulating its output to give the best charge possible to the battery. In further embodiments the battery may learn about the capacity of the generator and updates its display accordingly. The 2-way communication bus may facilitate flexibility for future development with new battery types being usable with the system or device while old device may continue to be supported.

In some embodiments the MCU may be powered by the ESU. The CCP may further comprise a universal asynchronous receiver/transmitter. The communications bus header may translate data between parallel and serial forms. In some embodiments a CCP may comprise and controller unit with a user interface.

In some instances a CCP may monitor the rotations per minute (RPM) of the engine and use that information to support different running modes, like "quiet" mode or "turbo" mode. In Quiet mode the RPM may be limited, which may limit the noise but reduces the power output. In Turbo mode the RPM may be allowed to go to max, maximizing power output but also producing loudest noise.

In addition to a hard-wired communication bus, there may also be a wireless communication bus. The wireless communication bus may facilitate the system communicating with a mobile device or computer network to a software application or internet service. The system or device may shares its current working state and allows the user to control it remotely through the application or internet service. In some instances the CCP of the portable hybrid generator may be configured to accept signals including satellite signals, local area network (LAN) network wired connections, and/or other wireless connections. The portable hybrid generator may be able to connect with one or more devices, such as communications satellites, towers, routers, servers, other microgrid units, or other external devices. The CCP may comprise a wireless radio interface, for accepting signals.

Some embodiments of the portable hybrid generator may comprise a CCP capable of communicating with mobile applications or other mobile devices. In some instances a CCP may comprise a transceiver for receiving satellite data, a terrestrial radio frequency transceiver, routers or switches, and/or one or more external devices for registering and securing communications with local devices that may be directly or wirelessly connected to the internet or other connection systems. A portable hybrid generator may be further equipped with one or more external devices for registering and securing communications with local devices that may be directly or wirelessly connected to the internet or other connection systems. In some embodiments, a CCP may comprise a communications bus port for connecting and communicating with external components.

Components—Power Conversion Unit (PCU)

A power control unit or PCU may comprise units or elements for converting stored or generated power to usable power. A PCU may comprise any combination of inverters with AC ports, USB regulators with USB ports, or battery direct protection circuitry with chaining ports.

A PCU may comprise a power inverter or inverter and one or more AC ports. A power inverter may be configured to accept DC voltage and convert it to AC voltage. A power inverter may accept voltages of greater than or equal to 4V, 8V, 12V, 24V, or 48V. An inverter may produce a square wave, pure sine, modified sine wave, pulsed sine wave, pulse width modulated wave (PWM), sine wave, or modified sine wave depending on circuit design. An inverter may have an output frequency. In some instances the output frequency may be further conditioned to get good transformer efficiency. An output voltage for an inverter may be 110-120 VAC at 60 Hz for North America and Japan or 220-240 VAC at 50 Hz for international locales. An inverter may further comprise an output power expressed in watts or kilowatts. The inverter may be matched and tuned to the battery source that will provide its power. The inverter may output 110-120 VAC at 60 Hz for North America and Japan or 220-240 VAC at 50 Hz for international locales. The inverter may be sized to provide less than, greater than, or equal to about 50 W, 100 W, 150 W, 200 W, 250 W or 300 W.

In some embodiments a PCU may comprise a USB regulator for providing power through USB ports. A PCU may also comprise battery direct protection circuitry and a chaining port for connecting other components or multiple units Components—Hybrid Power Source (HPS)

Figure 5:
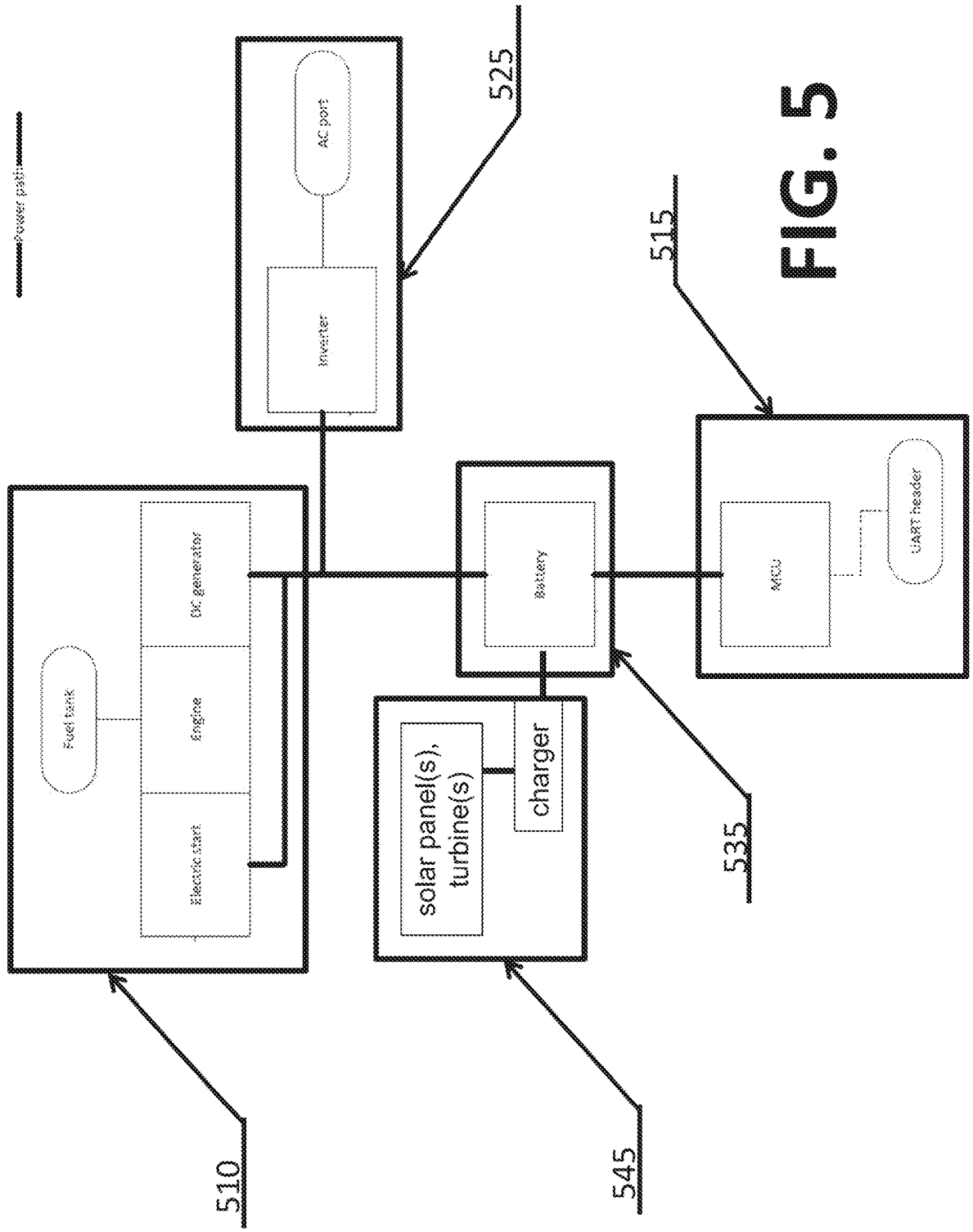
FIG. 5 illustrates a block diagram for subcomponents described in FIG. 4, as well as the hybrid power source (BPS).

In further embodiments the system may further comprise means for generating and storing electrical energy from alternate energy sources, for example solar panels and/or wind turbines. FIG. 5 illustrates the examples of subcomponents described in FIG. 4, with the addition of a hybrid power source (545) which may comprise hybrid power sources which may include any combination of one or more solar panels, one or more turbines, and a charger unit. The other components presented in FIG. 5, may comprise any of the subcomponents mentioned in FIG. 4. FIG. 5 illustrates that a portable hybrid generator may comprise a primary energy source or PES (510), a power conversion unit or PCU (525), an energy storage unit or ESU (535), and a controller and communications port (515). A PES (510) may comprise an engine, engine start, generator, fuel tank, and any combination thereof. A PCU (525) may comprise an inverter and ports including AC ports. An ESU (535) may comprise a battery. A controller and communications port (515) may comprise a microcontroller unit (MCU) and/or a communications bus header.

A hybrid power source or HPS may comprise renewable energy sources. Renewable energy sources may include solar energy and/or wind energy. The renewable energy sources may generate electricity. In some embodiments the HPS may comprise solar panels or photovoltaic (PV) panels. PV cells may be employed. The PV panels may be connected into a PV system, comprising a single panel or an array of PV panels. The panels may be grouped. Groups of panels may be wired in series, in parallel, or any combination thereof. Panels in groups may be wired in series, in parallel, or any combination thereof Components—Maximum Power-Point Charger In some embodiments, a portable hybrid generator may comprise a maximum power-point charger or MPPT charger. The MPPT charger may ensure that the engine is being loaded such that it is producing maximum power. The MPPT charger may dynamically adjust its charging level so that maximum power is output from the engine. The MPPT charger may comprise a switch-mode regulator with an adjustable output voltage setting. The MCU may control the voltage setting. An MPPT charger may be equipped to account for variations in engine output dependent on external conditions that may affect engine performance, for example when the environment is hot or cold, when the system or device is at high altitude, when the battery level is low, and in other others conditions. An MPPT charger may perform better than a standard charger, since standard chargers may be set to operate as a fixed load and might over-drive the engine or leave power on the table, both cases resulting in less power output than is available.

Ports and Portability

A portable hybrid generator may be used in a variety of situations where portable power is needed. For example, the portable hybrid generator may be used to power communication equipment including phones and computers; it may be used to support base camps or camp sites by supporting lights and/or refrigerators. In some instances a portable hybrid generator may be used to support equipment during remote photo shoots, it may be used as a power source in a recreational vehicle (RV) or even as a source of backup power in emergencies. A user may be able to carry the unit to a car or other vehicle for transportation purposes.

A portable hybrid generator may be easily transported by one or two standard size adults. In some instances the portable hybrid generator may be configured for transport by a standard size adult with one hand. In other instance transport of the portable hybrid generator may be larger in size and heavier in weight. The portable hybrid generator may, in some embodiments, require two standard size adults. The portable hybrid generator may weigh less than, more than, or equal to about 15 pounds, 25 pounds, 50 pounds, 100 pounds, 150 pounds, 175 pounds, or 200 pounds in weight. In some instances a portable hybrid generator may be roughly the size of a standard cooler, for example the portable hybrid generator may be greater than a 16 quart, 32 quart, 48 quart, 64 quart, or 80 quart cooler. In some instances the portable hybrid generator may have handles, wheels, rollers and any single or additional features that may assist in transport. The portable hybrid generator may be small and light enough to transport in a stand size or even small automobile. The system may be able to be lifted with one hand. The system may be able to be lifted by a single adult using a single hand, or both hands.

The system may be configured for easy portability, and it could have a generator that is separable from the battery unit or it may comprise a single unit with a generator and a battery such that the energy may be derived from the battery alone, the generator alone or both the battery and the generator. In some instances the battery may be used while the generator is not in operation.

In some instances the system may be equipped to detect the availability of auxiliary power sources including wall power or solar panels.

Figure 6:
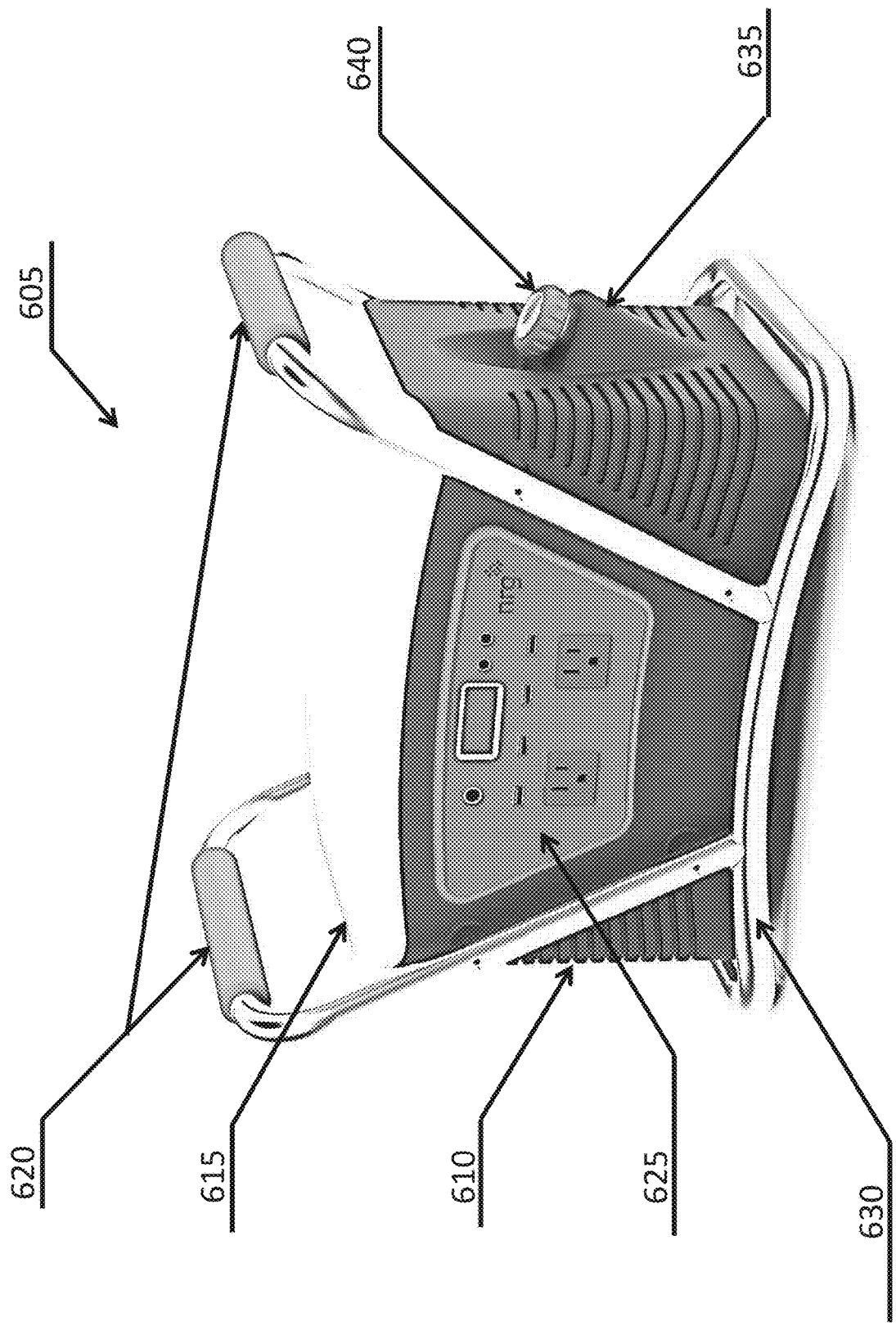
FIG. 6 illustrates in self-contained portable hybrid generator, as described in FIG. 2, FIG. 3, FIG. 4, and FIG. 5.
Figure 7:
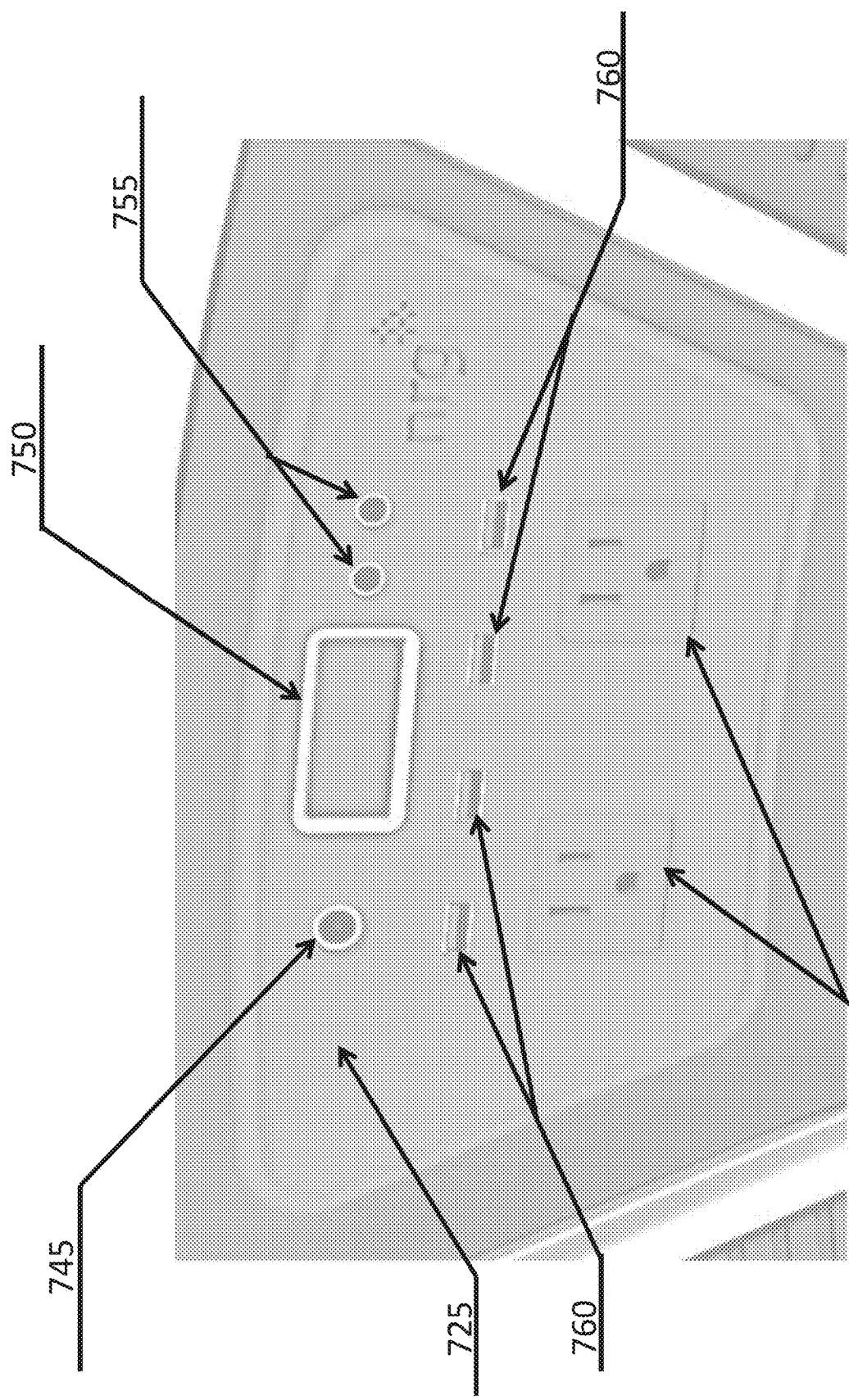
FIG. 7 illustrates in detail, ports that may be found on a self-contained portable hybrid generator unit.

In embodiments, as shown in FIG. 6, the system may comprise a self-contained unit with a PES, ESU, PCU, Controller and communication port and outputs (as shown in FIG. 2, FIG. 3, and FIG. 4). Some embodiments of a self-contained portable hybrid generator may further comprise a hybrid power source (HPS) as disclosed in FIG. 5. A self-contained portable hybrid generator, as shown in FIG. 6, may comprise handles (620), a lid (615), housing (610), a frame (630), and a fuel tank (635) with a fuel cap (640). As shown in FIG. 7, the portable hybrid generator may further comprise a set of ports and a display (625, 725). A display (750) may have a length and height greater than or equal to 1", 2", 3", 4", 5", 6", 8" or 10". The display may be LCD, digital/analog, LED, or other common displays. Ports may comprise DC ports or plugs including 12V DC ports (745), cylindrical DC connectors (755), or USB hubs (760). DC plugs or connectors may comprise any single or combination of standard or non-standard DC plugs or connectors. Standard or non-standard DC plugs or connectors may comprise cylindrical connectors, snap and lock DC power connectors, Molex connectors, International Electrotechnical Commission (IEC) connectors, Tamiya connectors, JST RCY connectors, Inverter tabs/lugs, Anderson Powerpole connectors, SAW connectors, Cigar lighters sockets and plugs, ISO 4165 connectors, XLR connectors, Clipsal connectors, USB sockets, or any other DC connectors including manufacturer specific DC connectors for example those used for particular instruments or mobile phones. A self-contained portable hybrid generator may further comprise AC plugs (765). AC plugs or connectors may comprise any single or combination of standard or non-standard AC plugs or connectors (765). AC plugs may comprise a broad range of styles and types with and without grounds including Type A, Type B, Type B3, Type BF, Type C, Type SE, and Type 0.

Figure 8:
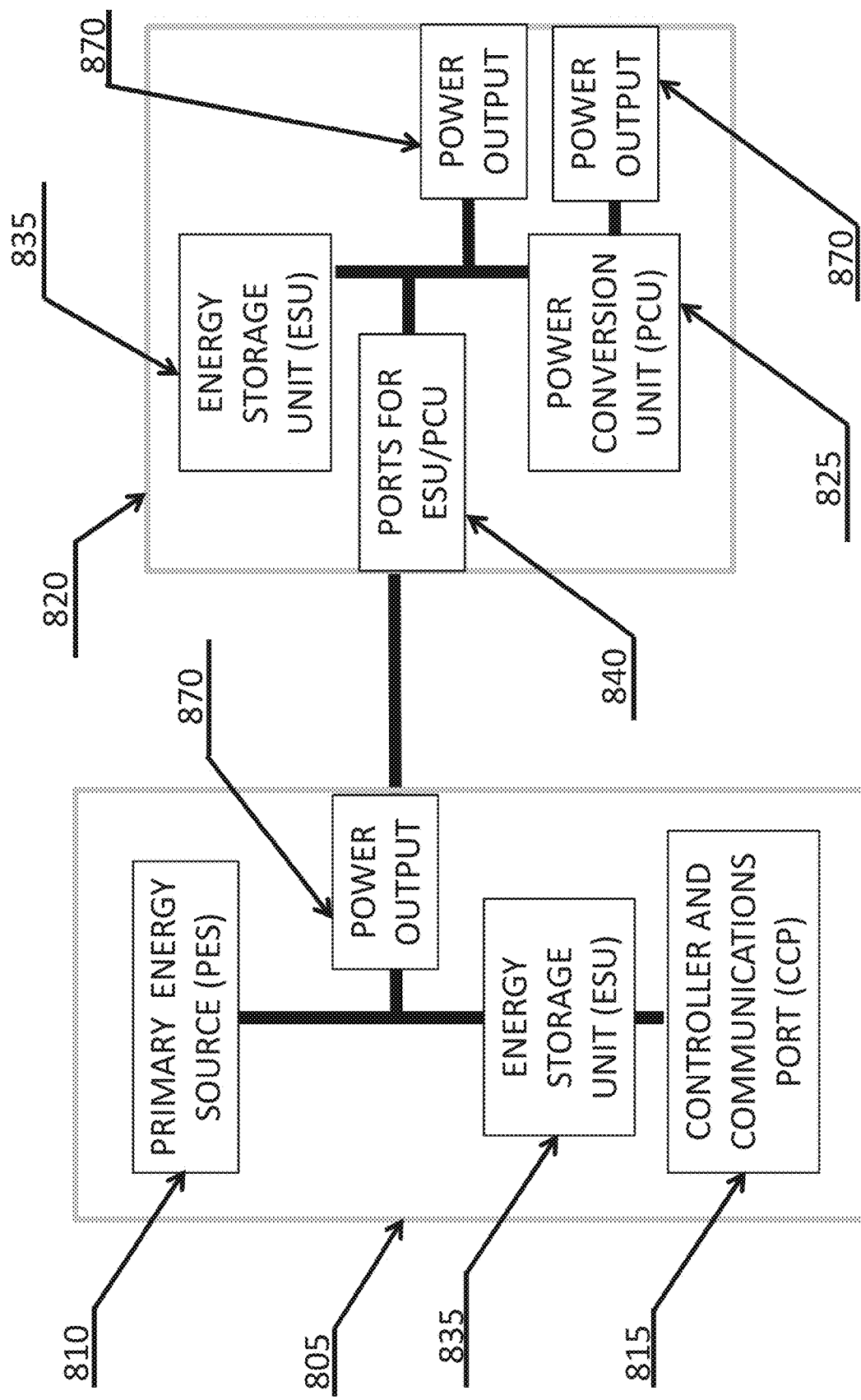
FIG. 8 illustrates a multi-unit portable hybrid generator with ports for attaching an additional separate energy storage unit (ESU).

In further embodiments the system may comprise an engine only, with a port for connecting other units that may be charged. Other units may comprise the primary energy source or PES component of the portable hybrid generator which may be used with other external components, or commercially available units. In other embodiments, the unit may be a single unit or part of a multi-unit array and the units can be scaled with growing energy needs. One example embodiment of a multi-unit portable hybrid generator is shown in FIG. 8, wherein the portable hybrid generator comprises two components; a PES containing component (805) that comprises a primary energy source (PES) (810), an energy storage unit (ESU) (835), a controller and communications port (CCP) (815), and a power output (870). The PES may comprise any of the previously mentioned PES containing units including an engine, a generator, a starter and a fuel tank. The ESU may comprise a battery, and/or batteries or other energy storage unit connected in series or parallel. The controller and communications port (CCP) may comprise a microprocessor and a communications bus header, and the power outputs may be any means for outputting power including DC or AC ports.

The multi-unit portable hybrid generator may comprise a secondary unit (820) comprising an energy storage unit (ESU) (835), a power conversion unit (PCU) (825), a port for connecting the secondary unit (840), and power outputs (870). The ESU (835) may be a battery or batteries or any other energy storage unit connected in series or parallel. The PCU may comprise an inverter of the type descried above or of a different variety, and the PCU may further include plugs including an AC plug or plugs.

A multi-component portable hybrid generator, as depicted in FIG. 8, may be useful for instances when the PES containing unit (805) may be operated at a location separate from where the power is needed or used. The secondary unit (820) could be charged by the generator in one location, and easily transported to another location where it may be used. In some instances the secondary unit (820) may be smaller in size than the PES containing unit (805). In other instances the secondary unit (820) may be more portable, lighter and/or easier to carry than the PES containing unit (805). In further instances, the secondary unit may differ from the PES containing unit in that it does not produce noxious fumes or make a lot of noise when operated. In these cases it may be easier for the secondary unit (820) to be transported for use in places where the PES containing unit could not be comfortably operated. In some instances a secondary unit may be charged by the generator, removed after it is fully charged and replaced with another secondary unit that is not fully charged. In some instances the PES containing unit (805) and the secondary unit (820) may be connected with a cord or cable. Power from the PES (810) in the PES containing unit (805) may move through the power output (870) into the ports for the ESU/PCU (840) in the secondary unit (820). The ESU may store energy that enters the secondary unit from the PES containing unit (805). In some instances power from the PES (810) may be stored in the energy storage unit (835) in the secondary unit (820) when the energy storage unit (835) in PES containing unit (805) is at capacity. In further instances, a PES containing unit (805) and/or a secondary unit (820) may comprise a hybrid power source (HPS) that collects and stores energy from alternative sources.

Figure 9:
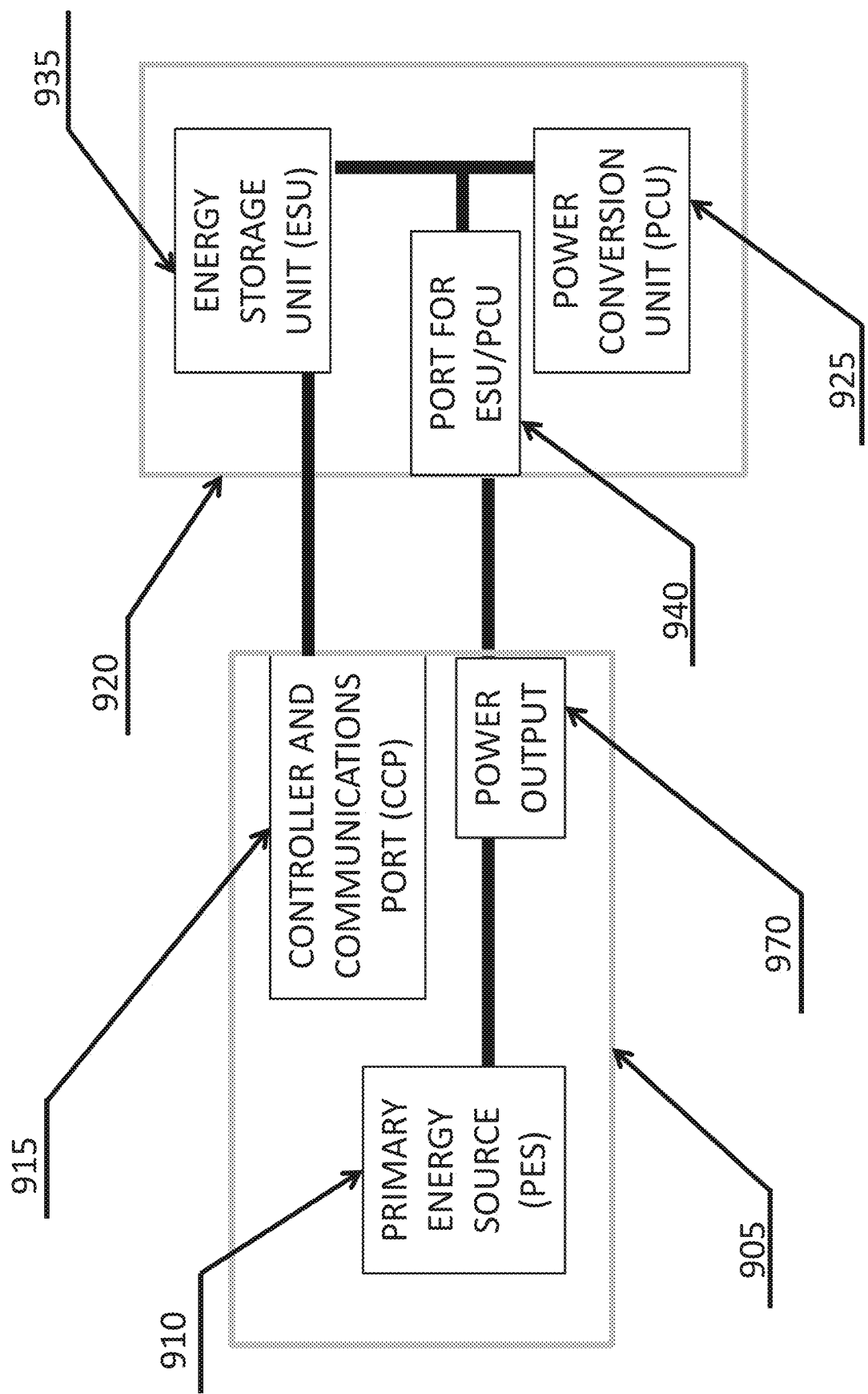
FIG. 9 illustrates a multi-unit portable hybrid generator with a separate energy storage unit (ESU).

FIG. 9 depicts yet another multi-component portable hybrid generator wherein the primary energy source (PES) is contained on one unit, the PES containing unit (905) and the energy storage unit (ESU) is contained on a separate unit, the ESU containing unit (920). In these instances the PES containing unit (905) may comprise a PES, a controller and communications port (CCP) (915) and a power output. In this configuration, a multi-component portable hybrid generator would rely on power from the energy storage unit on the energy storage unit (ESU) containing unit (920) to power the CCP (915). In these instances the CCP may be configured to automatically detect when an ESU containing unit is connected.

In some instances a PES containing unit may comprise connectors for connecting to Yetis. In some instances an ESU containing unit may comprise a Yeti. A PES containing unit may connect to an ESU containing unit through chaining ports. In other instances a PES containing unit may connect to an ESU containing unit through a cable. In further instances a PES containing unit may connect to an ESU containing unit directly, for example by clipping to the top of the Yeti with an arm that plugs into a port, for example a chaining. In further instances still, multiple ESU containing units may be connected or chained together. ESU containing units or Yetis may have ports or connect other components including loads and hybrid storage units (HSUs).

Figure 10:
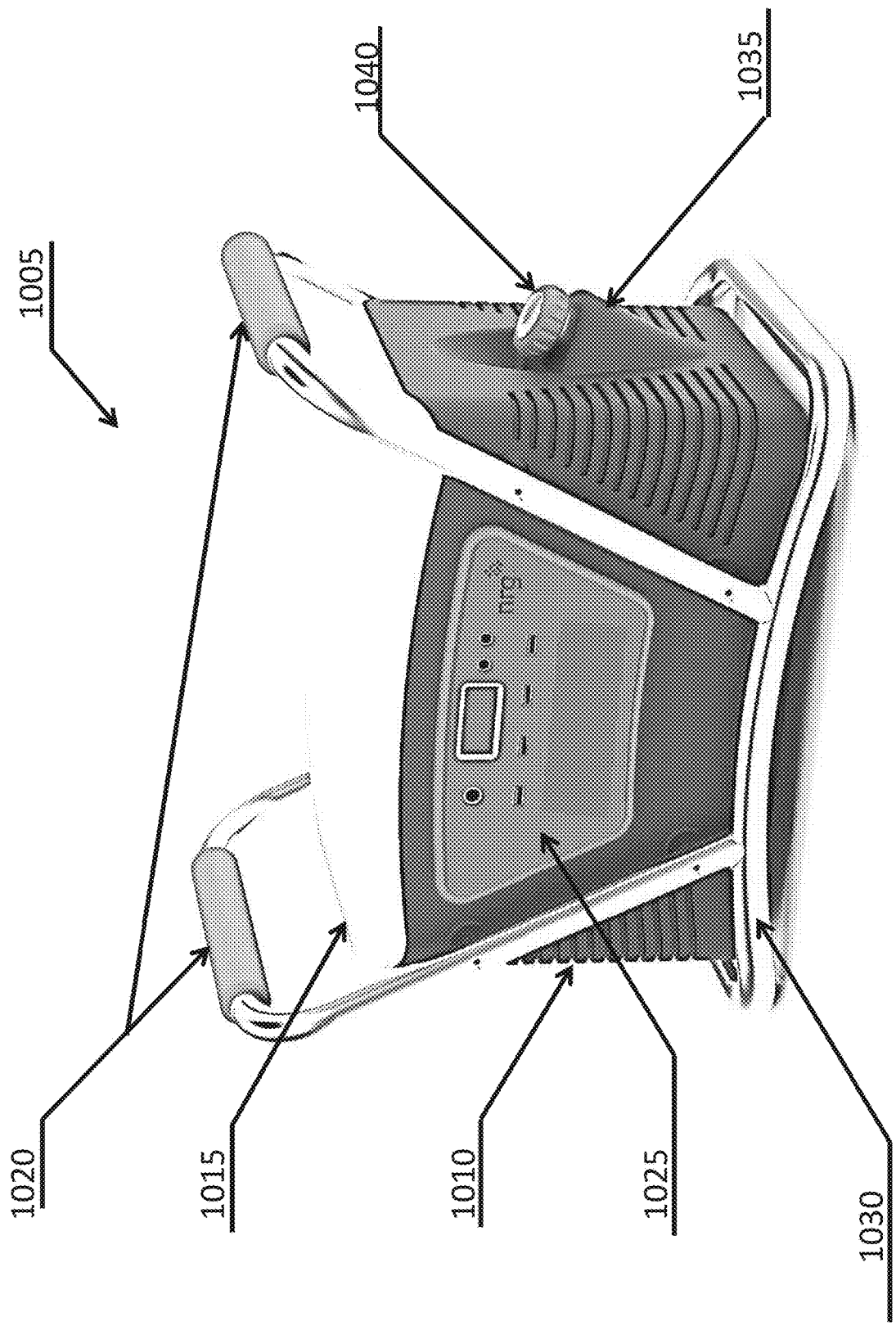
FIG. 10 illustrates a multi-unit portable hybrid generator for attaching one or more separate energy storage components.
Figure 11:
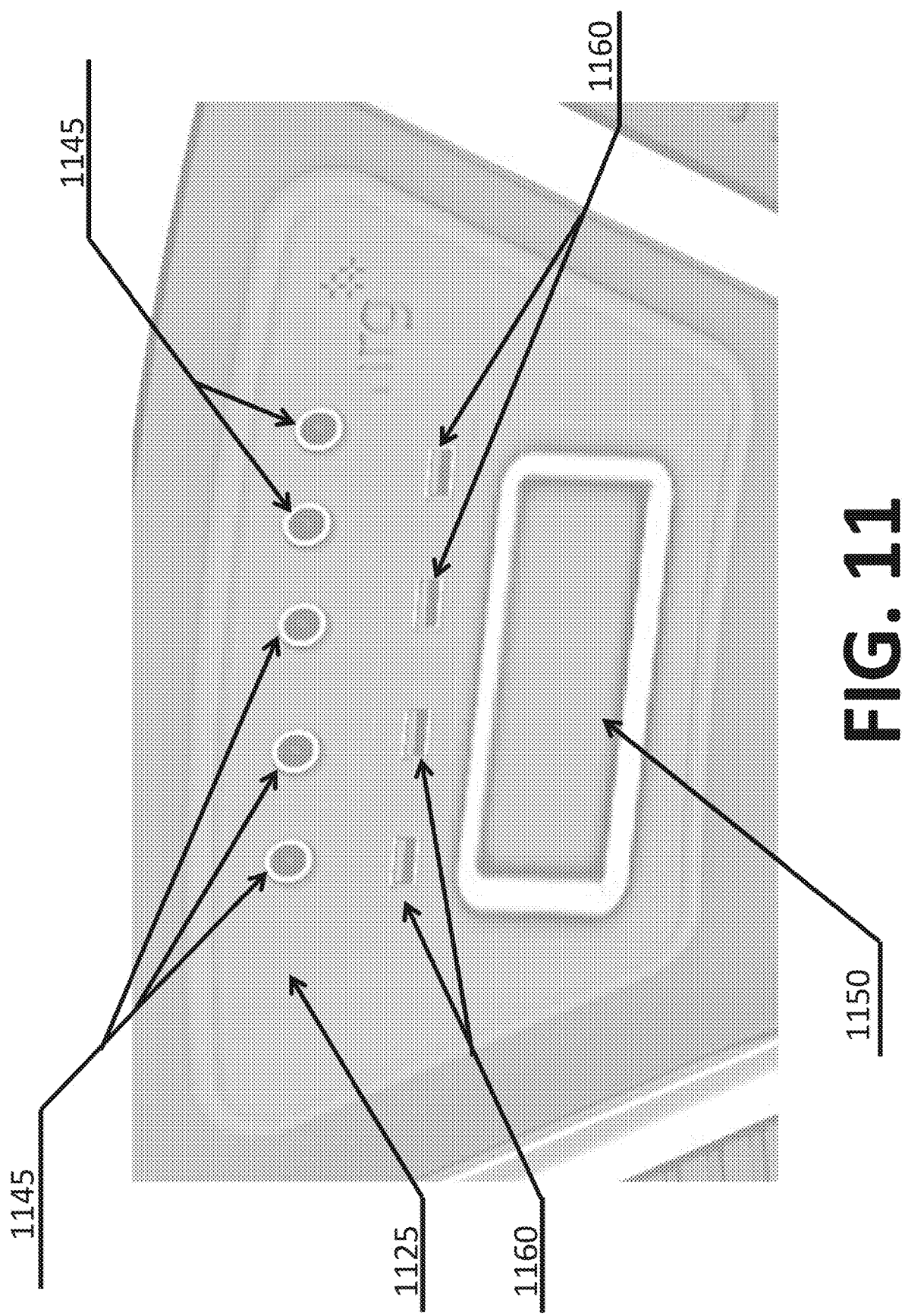
FIG. 11 illustrates a multi-unit portable hybrid generator and detailed illustration of ports that may be found on the primary energy source (PES) containing portion of the portable hybrid generator.

FIG. 10 illustrates an example of the PES containing unit (805, 905) of a multicomponent portable hybrid generator. A PES containing unit, as shown in FIG. 8 and FIG. 9, may comprise handles (1020), a lid (1015), housing (1010), a frame (1030), and a fuel tank (1035) with a fuel cap (1040). As shown in FIG. 7, the portable hybrid generator may further comprise a set of ports and a display (1025, 1125). A display (1150) may have a length and height greater than or equal to 1", 2", 3", 4", 5", 6", 8" or 10". The display may be LCD, digital/analog, LED, or other common displays. Ports may comprise DC ports or plugs including 12V DC ports (1145), cylindrical DC connectors, or USB hubs (1160). For example, FIG. 11 may represent the PES containing unit for any of the embodiments depicted in FIG. 8 or FIG. 9. In instances where the PES containing unit (805, 905) does not comprise a power conversion unit (PCU), it may comprise DC ports without AC ports. DC plugs or connectors may comprise any single or combination of standard or non-standard DC plugs or connectors. Standard or non-standard DC plugs or connectors may comprise cylindrical connectors, snap and lock DC power connectors, Molex connectors, International Electrotechnical Commission (IEC) connectors, Tamiya connectors, JST RCY connectors, Inverter tabs/lugs, Anderson Powerpole connectors, SAW connectors, Cigarette lighter sockets and plugs, ISO 4165 connectors, XLR connectors, Clipsal connectors, USB sockets, or any other DC connectors including manufacturer specific DC connectors for example those used for particular instruments or mobile phones.

Figure 12:
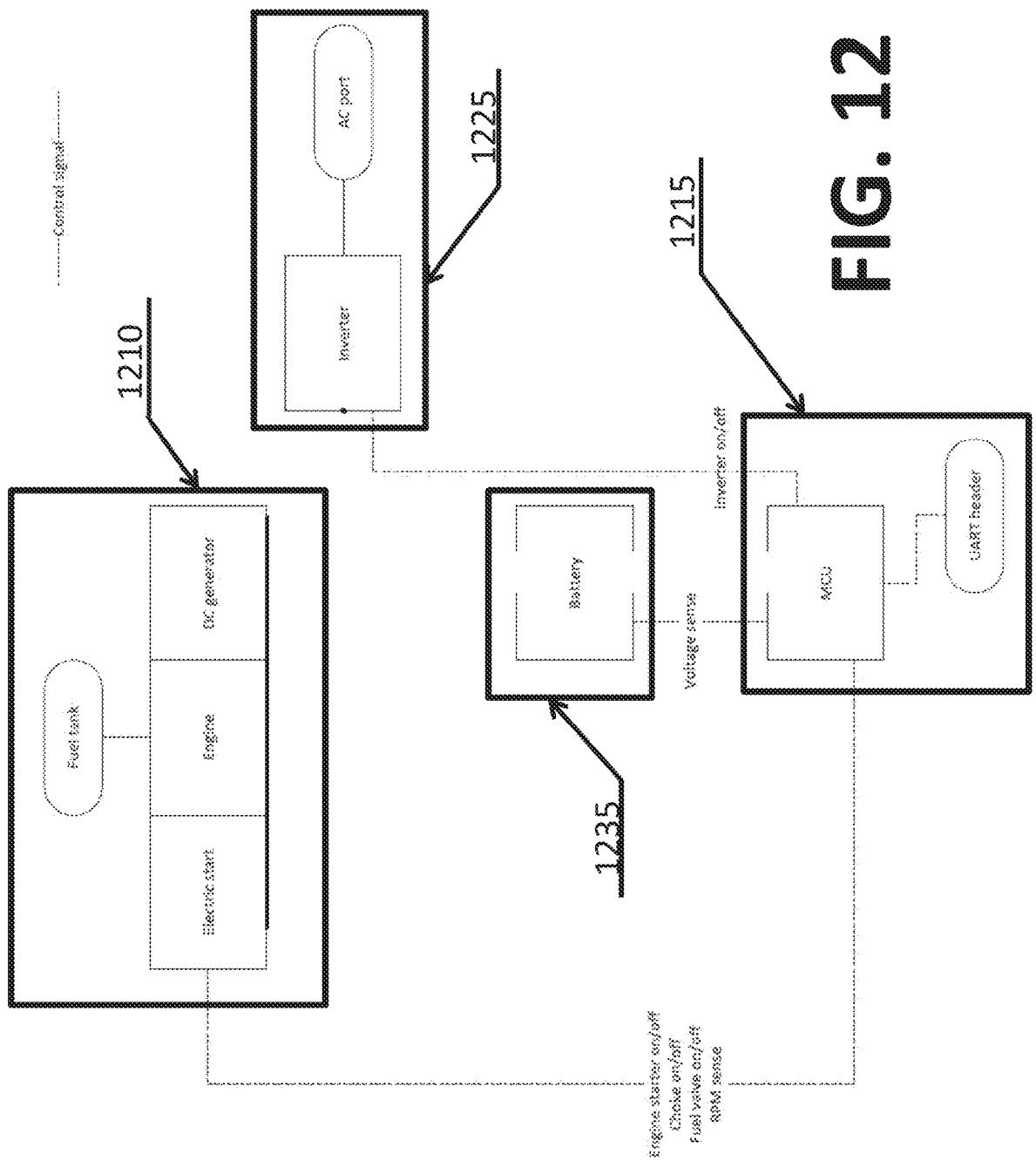
FIG. 12 illustrates a control diagram showing the control signal between different components of the portable hybrid generator.

FIG. 12 illustrates an embodiment of a control signal paths that may be used to regulate any of the aforementioned components presented in the present application. The control path diagram illustrates the PES (1210), ESU (1235), PCU (1225), and Controller and Communications Port components (CCP) (1215), as well as the regulation that occurs between them. In some instance the controller and communications port (CCP) may control signals through different components in the system. For example the CCP may regulate the on/off states of the engine starter, the choke, the fuel valve and it may comprise an RPM sensor. The CCP may also be configured to sense voltage or charge state from the energy storage unit (ESU). In further instances, some embodiments may comprise a CCP that can control the on/off state of the inverter.

The CCP may interact with the PES, ESU, and PCU may comprise two-way communications. Information compiled and exchanged from the CCP may include information about energy production, operational states, efficiency, alarm or malfunction conditions, or any other information. Information from the CCP to the PES, ESU, and PCU may comprise commands to adjust an operational state (e.g., turn on, off, adjust energy collection modes, etc.), adjust states or relative states.

Each component of the portable hybrid generator may be individually controlled by the CCP, and in some instances the CCP may provide the user with operation instructions. In some embodiments a PES may comprise an engine, wherein the CCP may control the choke independent of the fuel valve. In these instances, the CCP may be configured such that the CCP independently actuates both components for the PES to start. In some instances the fuel valve may need to be turned off prior to engine shutoff, this may be necessary to prevent clogging of the carburetor by allowing all fuel in the PES to be consumed before shutoff. In instances when a user hits an emergency stop button the engine may stop immediately by terminating electrical connection to the spark plug. In these instances gasoline may be left in the carburetor, and the user may be presented with information and a recommendation to start the engine again so that normal shutdown can occur.

In some instances a CCP may engage an automatic turn-on/turn-off feature. In instances where the ESU energy storage is low, for example less than or equal to 10%, 20%, 30%, 40%, 50%, or 60%, the CCP may automatically turn-on the engine, and in further instances the CCP may turn off the engine when the ESU is charged to 100%. Other modes or options may also be included as optional features or settings. In some instances there may be several charging modes, for example the user may be able to engage other settings including "minimize engine" and "maximize-lifecycle". A "minimize-engine" feature would only partially charge the ESU to a given set point. A set point may be established based on the rate of charging an ESU at a given ESU charge state, for example in some instances the last 20% of charge for an ESU may take longer than the initial 80% of charge for the ESU, in these instances the set point may be 80% and the engine will shut off once the 80% charge state in the ESU is attained and would minimize the length of time the engine would need to run for. A maximize-lifecycle feature may comprise control setting that start charging the battery at a threshold range, for example 30%-50%, which maximizes the lifecycle of the battery. In these instances, the control system may also limit the max charge level based on the ESU type and the storage methods used in the ESU.

In further instances, a CCP may be able to regulate automatic PES operation under a broad range of environmental conditions. In some instances the CCP may be equipped with sensors for detecting the temperature and RPM of an engine in the PES. In further embodiments the CCP may be equipped to adjust the PES or components of the PES in accordance with environmental conditions. Components that may be adjusted may include the choke, the fuel valve, and the engine starter. CCP may control components to perform automatic starting and operations of the engine.

A CCP may display the status of inputs from a display screen. In some instances the CCP may provide information including run-time, loading, efficiency metrics and system health information onto a display screen. In some instances a display screen may comprise a screen composed from one or more components of the portable hybrid generator. In other instances the display screen may comprise the screen of an application run on a mobile device. In further instances a mobile device may be a phone, tablet, computer or other mobile device. In further instances still, an application run on a mobile device may be used to control one or more of the components detected or reported by the CCP. In some instances the CCP may display the status of one or more components of the system to indicate whether maintenance needs to be performed. In other instances the CCP may display operations that need to be performed.

A CCP may comprise features for remote or direct user control. In some instances, a user may be able to select automatic or manual engine startup and shutdown. In further instances, a user may be able to manually startup and stop the engine at any time. In further instances, the user may be able to set a schedule wherein the engine has timeframes of operation. In further instances, automated and/or manual controls may be available from the portable hybrid generator controls and/or from an application run on a mobile device. In further instances every electronically controlled mechanism or sensor may be reported and controlled from an application run on a mobile device.

In some instances an application may be designed to have the easy-to-use or simple operations available upfront. More advanced operations may be hidden and made available to only more advanced users. Easy-to-use or simple operations may comprise: start, stop, time-to-charge, time-to-discharge, enable/disable all ports, ESU status, and power output. Advanced operations may comprise any and all additional operations. An application run on a mobile device, or mobile application, may present written as well as graphic information to the user. Written information may include user recommendations, safety tips, and performance data. Graphic information may comprise icons.

In some instances the system may be equipped to detect the availability of auxiliary power sources including wall power or solar panels. Detection may occur through the detection in voltage at an input port, for example a DC or AC connection port. In these instances priority may be given to auxiliary power port over miming the engine. The system may be able to measure input current from an auxiliary power source. System may be equipped with the ability to dynamically draw more or less current through its internal charge controller. In some instances is may use a maximum-power-point algorithm to ensure the maximum power is being drawn from the auxiliary input. User may have the ability to switch the priority of auxiliary and PES energy sources. In some instances the user may be able to adjust a set-point or set-points for instances when the system is or is not under load.

Figure 13:
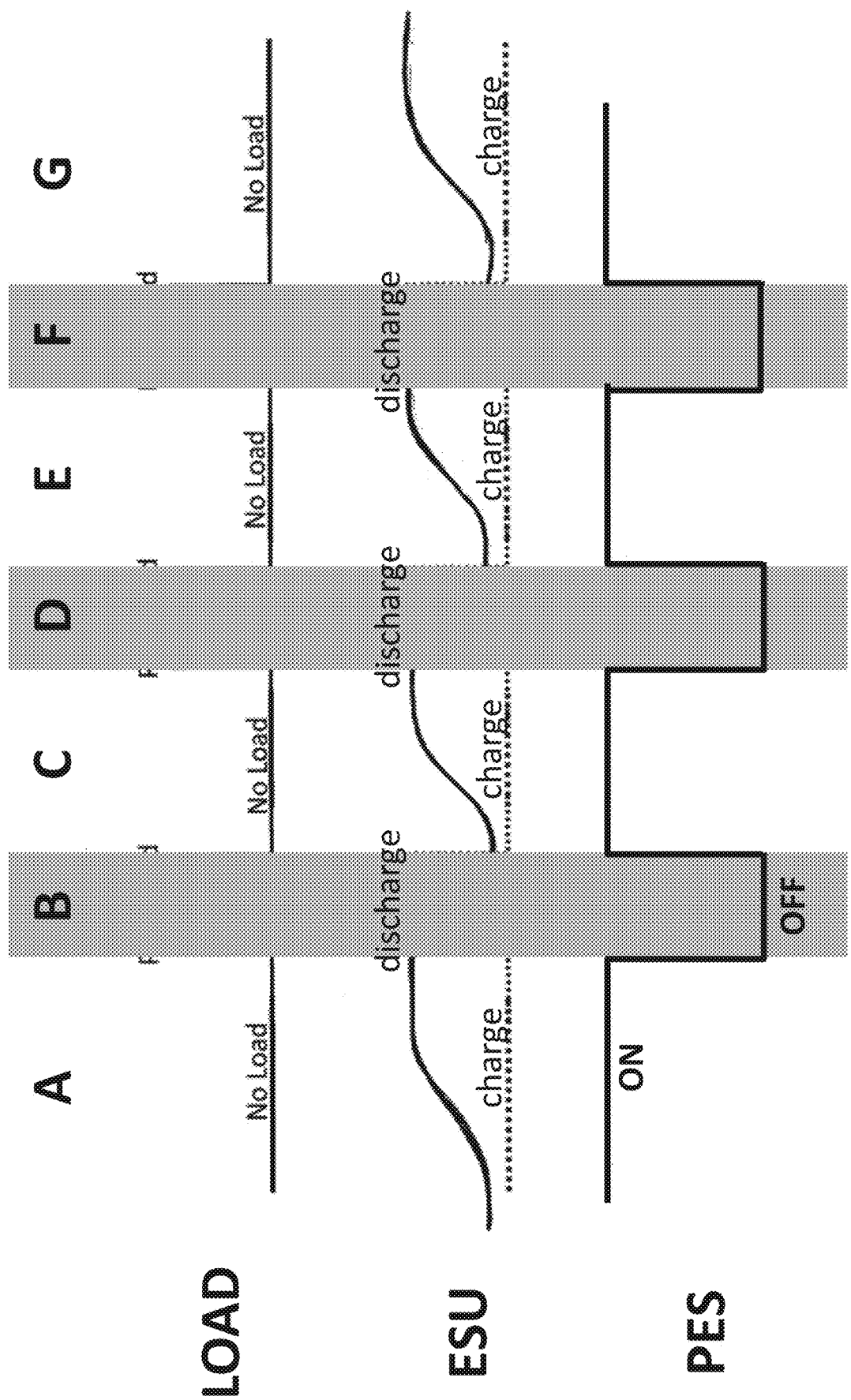
FIG. 13 illustrates a method for pairing a small generator with a battery to meet the needs of fluctuating loads that may be supported by a portable hybrid generator.

FIG. 13 illustrates a mechanism by which portability may be enhanced by using a smaller PES coupled to an ESU, such that the ESU supports most of the load on the system. In some instances the PES may be specifically calibrated to one load, the load of the ESU. This may differ from conventional generators which may run when non-optimal or even when no load is engaged. In contrast a portable hybrid generator may be configured with a PES that can run at 100% efficiency while the energy is being stored in an ESU, and the ESU may be configured to support other loads on the system. In further instances, as shown in FIG. 13, a portable hybrid generator may comprise calibrated to specific peak loads (B, D, F), wherein the loads are not operating all the time and instead have peaks where they are not operating on the system (A, C, E, G). In these instances a PES of smaller size than required to support the peak load may be used, when paired with an ESU that can supplement or support the needs of the load over its operation time. In some instances, this approach may minimize the size of the unit and optimize portability.

FIG. 13 illustrates a system where the output peak loading is on the ESU instead of the PES. In this representation peak loads are supported by a PES and an ESU. During time point A, the PES is turned on and the ESU is charged. At time point B, the load is drawing power from the system through the ESU, and the PES is charging the ESU. In instances where the PES is connected to the ESU and the ESU is the principle energy source (FIG. 2) the PES is solely responsible for charging the ESU. In instances where both the PES and the ESU provide energy to the loads (FIG. 3) energy may be drawn from the ESU and the PES to support the peak loads. In time point C, no loads are drawing energy from the system and the PES is solely responsible for charging the ESU. This method of operation may improve efficiency due to the hybrid approach, enabling a smaller displacement PES to support the load instead of a comparably larger convention DC engine, DC genset or genset.

Figure 14:
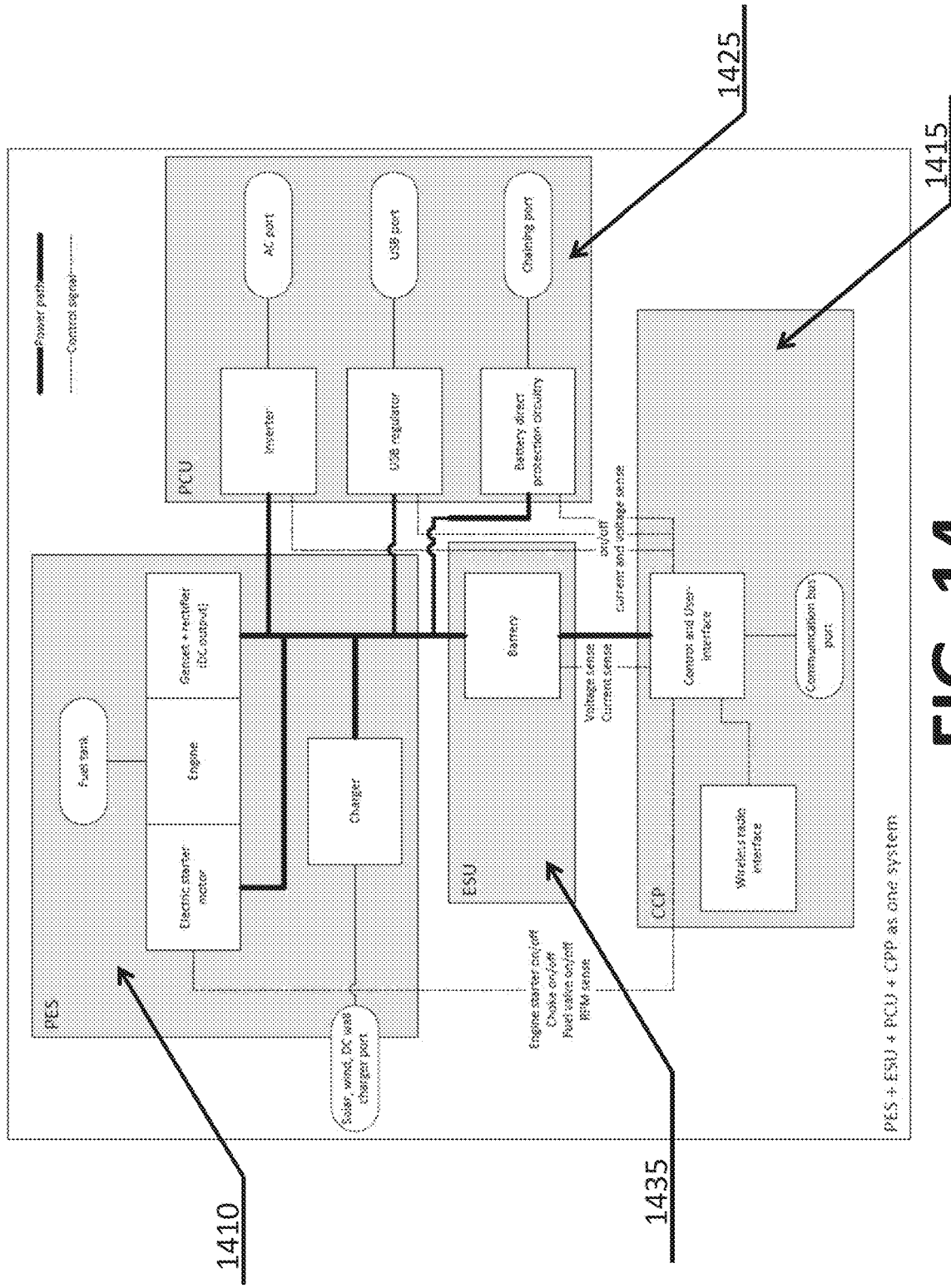
FIG. 14 illustrates a detailed example for a portable hybrid generator that uses a separate electric starter motor to start the engine.

FIG. 14 illustrates a system where a separate electric starter motor is used to start the engine. In these instances a portable hybrid generator may comprise a primary energy source or PES (1410), an energy storage unit or ESU (1435), control and communication port CCP (1415), and a power conversion unit or PCU (1425). A PES (1410) may comprise a fuel tank, electric starter motor, engine, genset with rectifier, charger, and charger port. A CCP (1415) may comprise a control and user-interface connected to a wireless radio interface and a communications bus port. The control and user interface component of the CCP may further be connected to the PES through the electric starter motor. In these instances the motor may be started using a separate electric starter. In further instances, the CCP may share connectivity with a solar/wind/DC wall charger port and charger.

Figure 15:
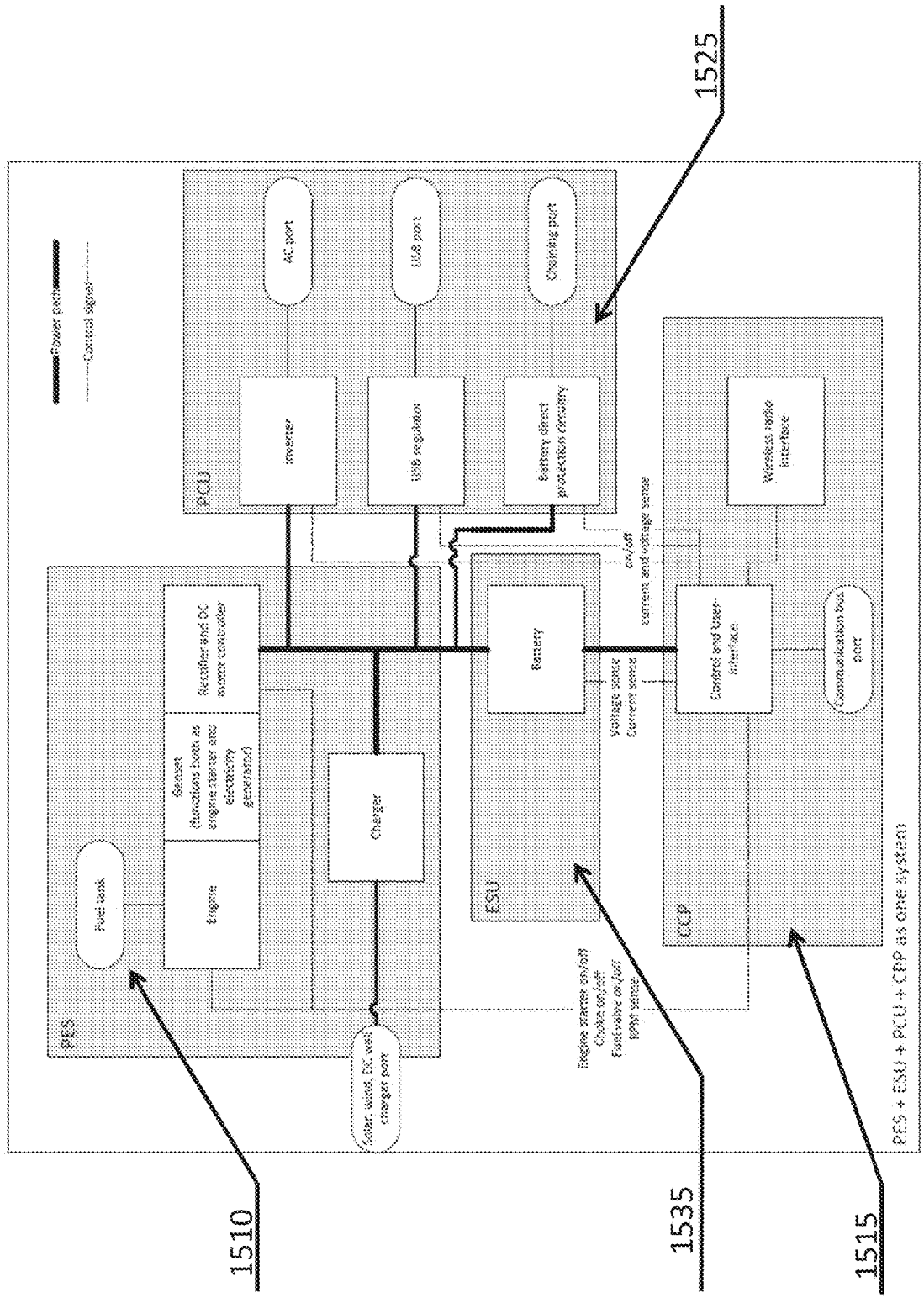
FIG. 15 illustrates a portable hybrid generator that does not require an additional starter motor.

FIG. 15 illustrates a system where the genset may operate as both the engine starter and electricity generator. In these instances a portable hybrid generator may comprise a primary energy source or PES (1510), an energy storage unit or ESU (1535), control and communication port CCP (1515), and a power conversion unit or PCU (1525). In these instances the PES may comprise a fuel tank, engine, DC genset or genset capable of functioning as an engine starter and electricity generator, as well as a rectifier and DC motor controller unit. In these instances the control and user-interface of the CCP (1515) may be configured to interact with the PES (1510) through the engine and the rectifier and DC motor controller. This configuration may eliminate the need for an additional starter motor.

Figure 16:
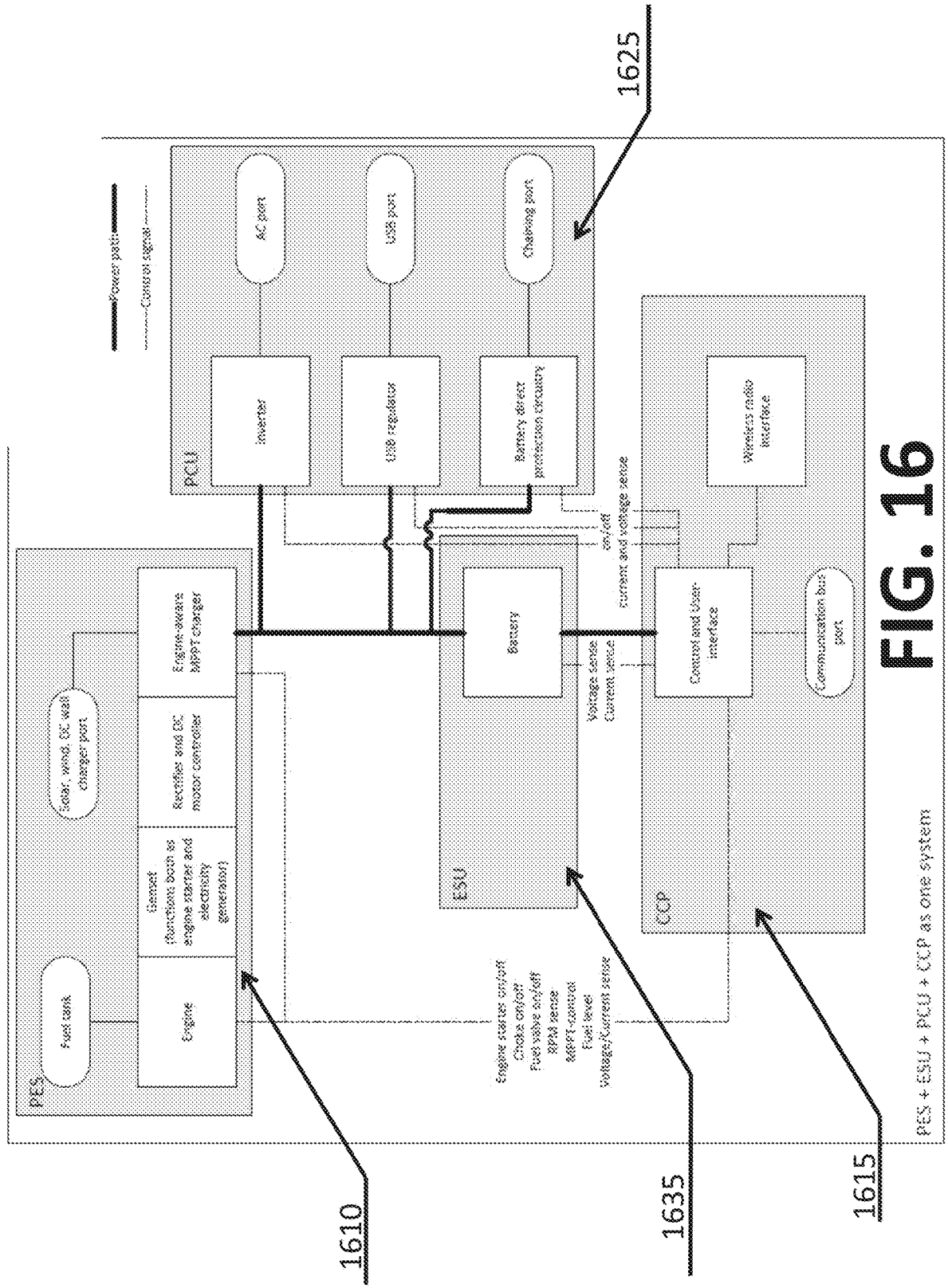
FIG. 16 illustrates a portable hybrid generator with a PES comprising a charger.

FIG. 16 illustrates an embodiment where a PES may comprise a solar, wind, DC wall charger port. In these instances a portable hybrid generator may comprise a primary energy source or PES (1610), an energy storage unit or ESU (1635), control and communication port CCP (1615), and a power conversion unit or PCU (1625). In these instances the PES may be used to directly charge alternate devices. In these configurations, a PES may comprise a fuel tank, an engine, a genset, rectifier and DC motor controller unit, and an engine-aware MPPT charger connected to a solar, wind, DC wall charger port. In these instances the CCP may control the engine and the engine-aware maximum power point tracking (MPPT) charger. In these instances the MPPT may replace the standard charger. The MPPT may take input form the genset output and the solar/wind/DC auxiliary power sources. In these configurations or embodiments thereof the genset may be equipped to function as both the engine starter and the electric generator eliminating the need for an additional starter motor.

Figure 17:
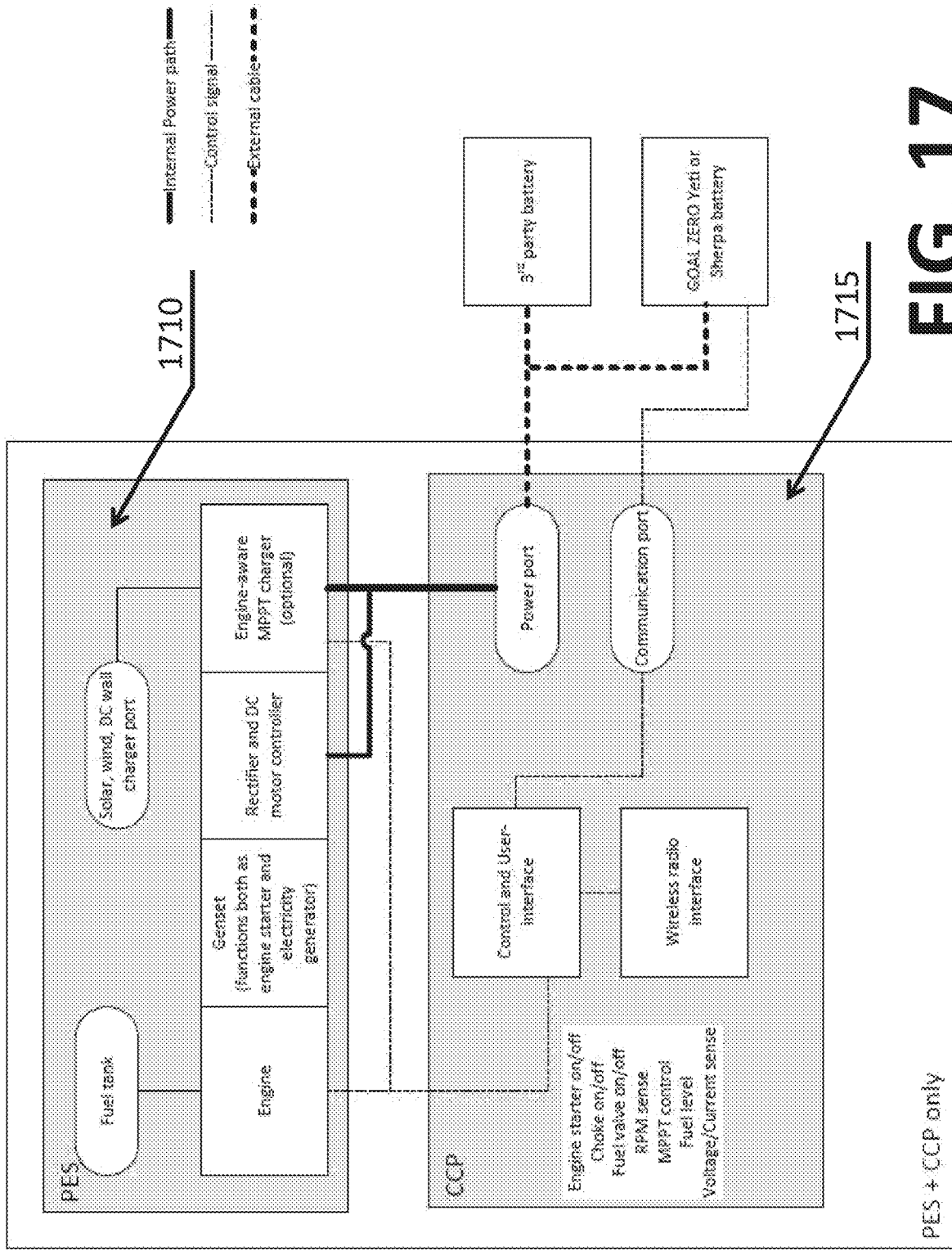
FIG. 17 illustrates a portable hybrid generator configured with energy storage on an externally connected ESU.

FIG. 17 illustrates an embodiment of a portable hybrid generator comprising a primary energy source or PES (1710) and a control and communications port or CCP (1715). In these instances a portable hybrid generator may connect to external battery storage system or an energy storage unit (ESU). In these instances the PES may comprise a fuel tank, engine, genset, rectifier and DC motor controller unit, engine-aware MPPT charger and solar/wind/DC wall charger port. A CCP may comprise a control and user interface connected to a wireless radio interface and a communications port. The CCP may further comprise a power port for connecting to the PES.

The power connections in a portable hybrid generator comprising a PES and a CCP with and external ESU may differ from those that have an internal ESU. In some embodiments the CCP may comprise a power port that is connected to the rectifier and DC motor controller in the PES. In further embodiments the PES may comprise an MPPT charger. In these instances, the power port in the CCP may be connect to both the rectifier and DC motor controller, as well as the MPPT charger. In further embodiments the MPPT charger may be an engine-aware MPPT charger. In these instances the control and user-interface may have a controllable connection to the engine and the engine-aware MPPT charger.

In embodiments where a portable hybrid generator is configured to connect to a battery or external energy storage unit or ESU, a broad range of batteries may be used. In some embodiments, the portable hybrid generator may connect to a GOAL ZERO battery or a $3^{rd}$ party battery through the power port. In further embodiments the external cable connection may comprise a power cable with or without an additional communications link. In instances where a communications link is used, the portable hybrid generator may be configured to connect to a GOAL ZERO Yeti or GOAL ZERO Sherpa battery.

Figure 18:
FIG. 18 illustrates a screenshot of the application.

The communications and control port (CCP) of any of the disclosed devices or systems may be configured to interact with a mobile application, through for example a wireless radio interface or communications bus port. Direct wireless communications may be provided between a portable hybrid generator and a mobile device. The portable hybrid generator and the mobile device may or may not communicate over a network (e.g., local area network (LAN), wide area network (WAN) such as the Internet, telecommunications network, etc.). FIG. 18 depicts an example screenshot for an application that may be operated on a mobile application and used to control the portable hybrid generator. Examples of components that may be controlled by a mobile application include the on/off state of settings including auto, fuel, servo and inverter. A user may be able to start and/or stop the generator via the mobile application. Readouts may be provided for the RPM, battery, generator, and the inverter. Additional readouts may provide information regarding the temperature and fuel level in the engine. Additional controls may exist for the charge limit of the voltage and current in the battery, and the connection to the throttle and choke in the engine. Optionally, one or mode selection options may be provided for operation of the hybrid generator. For example, a usage mode may comprise a quiet mode, normal mode, and/or turbo mode that a user may select.

In some embodiments, a portable hybrid generator may comprise assemblies and/or methods for mitigating risks associated with the ability to start the engine automatically under defined conditions. In some instances, these assemblies and/or methods may prevent or lock out the engine from starting. This may prevent a user from inadvertently starting the engine from running. In some instances, this may prevent the engine from starting in an unsafe environment or condition. In others, the assemblies and/or methods may stop an already running engine. In some instances, the engine may automatically stop running when an unsafe condition is detected. Examples of lock out assemblies may include a button sequence of sufficient complexity to prevent inadvertent entry, an electronic prompt on the display panel of the generator or a remote electronic device, or an internal feature such as a jumper that could only reasonably be located or accessed by removing a physical warning tag. In some embodiments, this may be an application running on an existing computing device. Examples of means to stop a running engine may include a periodic timeout requiring user intervention to reset, operating outside safe conditions such as ambient temperature, or environmental sensors monitoring safe levels of hazardous substances such as smoke or carbon monoxide. For example, one or more sensors may detect operating characteristics of the hybrid generator, and/or environmental conditions. When the one or more unsafe condition is detected by the one or more sensors, the engine may be stopped from running. The engine may be stopped from running prior to starting the engine, or while the engine is in operation.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A portable hybrid generator system comprising:
    a first unit including:
        a first housing;
        a first output port; and
        a primary energy source disposed within the first housing, the primary energy source electrically coupled to the first output port, the primary energy source including an engine, a fuel tank, and a generator driven by the engine;
    a second unit separate from the first unit, the second unit including:
        a second housing;
        an input port;
        a second output port; and
        an energy storage device disposed within the second housing, the energy storage device electrically coupled to the input port and the second output port, the energy storage device including at least one battery;
    wherein the input port and the first output port facilitate selectively electrically coupling the first unit to the second unit to charge the energy storage device using electricity generated by the generator;
    wherein the primary energy source is specifically calibrated or calibratable to charge the energy storage device based on the at least one battery; and
    wherein the second unit is configured to be able to be selectively decoupled from the first unit and transported to a location remote from the first unit to power or charge an external device via the second output port using stored energy in the energy storage device.

2. The portable hybrid generator system of claim 1, wherein the input port is a second input port, wherein the first unit includes a first input port configured to facilitate connecting an external source to the first unit, wherein electricity provided by the external source to the first unit is transmittable from the first unit to the energy storage device of the second unit.

3. The portable hybrid generator system of claim 2, wherein the external source is a solar panel.

4. The portable hybrid generator system of claim 1, wherein the input port is a first input port, and wherein the second unit includes a second input port configured to facilitate connecting the second unit to a solar panel to facilitate charging the energy storage device with the solar panel.

5. The portable hybrid generator system of claim 1, further comprising a controller configured to:
    calibrate the primary energy source to the energy storage device; and
    control a power output of the primary energy source provided to the energy storage device based at least in part on the calibration of the primary energy source to the energy storage device.

6. The portable hybrid generator system of claim 5, wherein the controller is configured to:
    receive a selection of a usage mode of the portable hybrid generator system; and
    control the power output of the first unit based on the selection and the calibration.

7. The portable hybrid generator system of claim 1, further comprising a controller configured to:
    receive information from the primary energy source and the energy storage device;
    use the information received from the primary energy source and the energy storage device to estimate a power output for the first unit according to a usage mode selected from a plurality of usage modes; and
    control the power output of the first unit based on the usage mode.

8. The portable hybrid generator system of claim 1, wherein the first unit includes a lid coupled to a top portion of the first housing, the lid providing selective access to an interior of the first housing.

9. The portable hybrid generator system of claim 1, wherein the first unit weighs less than 100 pounds, and wherein the first unit includes one or more handles that facilitate manually transporting the first unit.

10. The portable hybrid generator system of claim 1, wherein the portable hybrid generator system weighs less than 100 pounds.

11. The portable hybrid generator system of claim 1, further comprising a cart configured to detachably couple to at least one of the first unit or the second unit.

* * * * *